US012732591B1

(12) United States Patent
Lerman et al.

(10) Patent No.: US 12,732,591 B1
(45) Date of Patent: Sep. 8, 2026

(54) VIRTUAL OFFICE MANAGEMENT

(71) Applicant: Roam HQ, Inc., Brooklyn, NY (US)

(72) Inventors: Howard C. Lerman, Miami Beach, FL (US); Thomas C. Dixon, Birmingham, MI (US); Sean J. MacIsaac, Brooklyn, NY (US); Kevin J. Caffrey, Alexandria, VA (US); Jeffrey A. Grossman, New York, NY (US); Klas Leino, Pittsburgh, PA (US)

(73) Assignee: Roam HQ, Inc., Brooklyn, NY (US)

( * ) Notice: Subject to any disclaimer, the term of this patent is extended or adjusted under 35 U.S.C. 154(b) by 314 days.

(21) Appl. No.: 18/379,972

(22) Filed: Oct. 13, 2023

Related U.S. Application Data

(60) Provisional application No. 63/416,347, filed on Oct. 14, 2022.

(51) Int. Cl.
*H04N 7/15* (2006.01)

(52) U.S. Cl.
CPC .................................. *H04N 7/157* (2013.01)

(58) Field of Classification Search
None
See application file for complete search history.

(56) References Cited

U.S. PATENT DOCUMENTS

| | | | | |
|---|---|---|---|---|
| 6,559,863 | B1 * | 5/2003 | Megiddo | H04N 7/15 348/E7.083 |
| 2006/0004605 | A1 * | 1/2006 | Donoghue | G06Q 10/10 705/2 |
| 2012/0204118 | A1 * | 8/2012 | Lefar | G06F 3/04883 715/756 |
| 2017/0339199 | A1 * | 11/2017 | Saez | H04M 1/03 |
| 2020/0382447 | A1 * | 12/2020 | Huang | H04L 51/02 |
| 2022/0197403 | A1 * | 6/2022 | Hughes | G06F 3/011 |
| 2022/0337443 | A1 * | 10/2022 | Sood | G06V 20/20 |

* cited by examiner

*Primary Examiner* — Duc Nguyen
*Assistant Examiner* — Assad Mohammed
(74) *Attorney, Agent, or Firm* — Lowenstein Sandler LLP

(57) ABSTRACT

A system and method to generate and manage a virtual office environment including a set of workspaces. A first user system is assigned a first workspace of the set of workspaces. A second user system is assigned to a second workspace of the set of workspaces. An interface is generated including display of a map including the first workspace and the second workspace, where the map displays first identifying information associated with the first user system in a first map portion corresponding to the first workspace and second identifying information associated with the second user system in a second map portion corresponding to the second workspace. The first user system is caused to move from the first workspace to the second workspace, where entry by the first user system into the second workspace causes initiation of a communication between the first user system and the second user system.

20 Claims, 13 Drawing Sheets

10
User Systems 101
VIRTUAL OFFICE MANAGEMENT SYSTEM 100
Virtual workspace generator 112
User manager 114
Virtual workspace manager 116
Processing Device 140
Memory 150

300
303
302
01
02
03
04

510
511
Meeting Room
512
513

500
501
Meeting Room
502
503
504
505
506
507
508
509
510

600
601
602
603
604
604A
604B 605
602
610
620
630
611
612
613
614
621
622
623
624
631
632
633
634

701
702
703
704
705
Unanswered No Team
That solved my issue! Thanks!
Can you try to restart your computer?
Hi, I need help!
My Team Conversations
Let me take a look for you.

800
801
802

User 801 adds shelf 800 to a workspace 850
User 801 selects shelf slot 851
Selected item is added to the selected shelf slot 852
User 802 visits room 853
User 802 views shelf 800 in room 854
User 802 views item in shelf 800 855
User 801 sees indication that User 802 is viewing item in shelf 800 856

User A navigates to Settings > Offices
1050
User A adds new offices to list
1051
User B is in Roam environment
1052
System checks User B's IP address against an office list
1053
If User B's IP address matches the office list, the system displays "In Office" indicator for User B
1054

1001
1010
Meeting Room
1012

1200
1201
1202
1203
1204
1205
1206
1207
1208
1209

VIRTUAL OFFICE MANAGEMENT

CROSS-REFERENCE TO RELATED APPLICATION

This application claims the benefit of U.S. Provisional Patent Application No. 63/416,347, filed on Oct. 14, 2022, the entirety of which is incorporated herein by this reference.

TECHNICAL FIELD

The present disclosure relates generally to a virtual office management platform. In particular, the present disclosure relates to managing features and functions of a virtual working environment including multiple different types of workspaces that can be occupied by users for engaging in various multi-user interactions.

BACKGROUND

Many companies have employees that are not present in a same physical location during the course of operations. These companies may employ a variety of software tools to enable distanced collaboration. For example, a company may use one or more software applications to enable certain work-related functions, such as video conferencing, chat messaging, project management, and whiteboarding.

Companies relying on these types of software tools face many challenges, such as difficulty in building camaraderie among employees, employees feeling isolated from the rest of the company, lack of company culture, lack of visibility for executives and managers into their employees' working hours and availability, building aversion to long, scheduled video conference meetings, difficulty in holding effective all-hands meetings, and the like.

To address some of these challenges, companies tend to acquire additional software in an attempt to force remote team bonding through virtual get-togethers. However, these existing programs create added expense and are ineffective in addressing the above-identified challenges associated with remote work environments.

BRIEF DESCRIPTION OF THE FIGURES

The present disclosure will be understood more fully from the detailed description given below and from the accompanying drawings of various implementations of the disclosure.

DETAILED DESCRIPTION

Aspects of the present disclosure address and overcome the aforementioned problems associated with typical remote workplace solutions by implementing a system configured to execute methods, functions, and operations to generate, provision, and manage a virtual office environment including multiple workspace types that can be occupied by multiple users associated with an entity (e.g., a company). The system (herein referred to as "virtual office management system") generates and managements one or more work environments (also referred to as "virtual work environments") including multiple workspaces. Example workspaces include, but are not limited to, an office building, an office or user room, a meeting room, an auditorium, a team room, a support bar, and the like.

According to embodiments, the system generates and manages a map including a virtual representation of one or more office buildings. The virtual office map illustrates the various aspects of the one or more office buildings, including locations of workspace types (e.g., rooms, offices, etc.) that one or more users can occupy. The system generates and displays one or more interfaces for one or more users to provide a representation of the virtual office and the user's location(s) within the virtual office. According to embodiments, the virtual office map can be customized or configured to include a desired number and arrangement of one or more floors including one or more workspace in accordance with one or more selections or commands received from one or more user systems (e.g., an office administrator, an office manager, a supervisor, an employee, etc.).

According to embodiments, the system can dynamically provision one or more interfaces displaying one or more interactive maps including customizable layouts of multiple workspaces. According to embodiments, users can virtually "enter" a workspace occupied by one or more other users to engage in a conversation (e.g., a video-based interaction, an audio-only interaction, etc.), where the workspace is a virtual representation of a physical office space. For example, a user can enter a workspace occupied by other users seated for a presentation, where the workspace is a virtual representation of a physical meeting room, a user's office, an auditorium or the like. According to embodiments, the system can generate workspaces including various presentation tools, seating, shelving and any other applicable object that may be found in a physical space.

Figure 1:
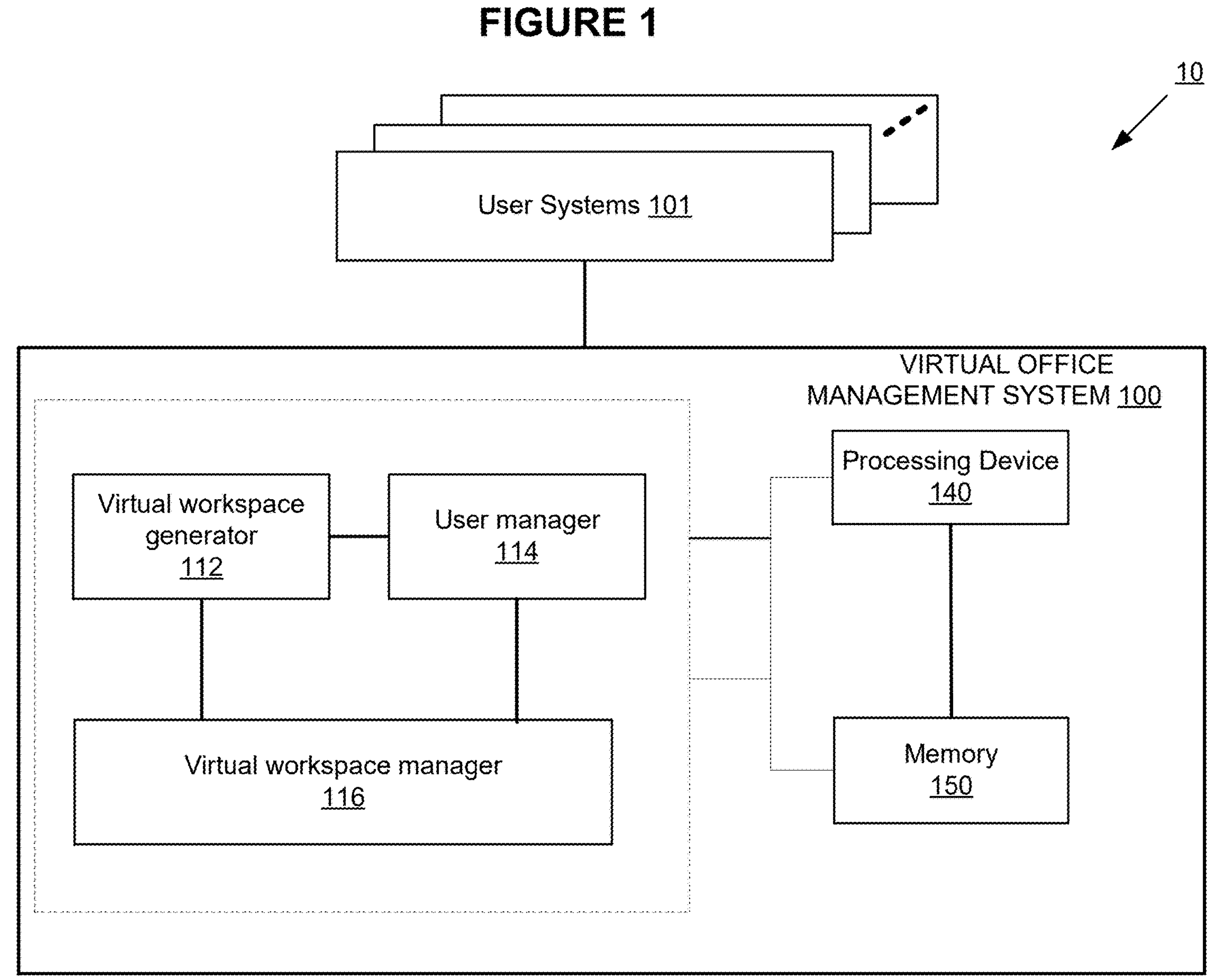
FIG. 1 illustrates an example computing environment that includes a virtual office management system operatively coupled to one or more user systems 101, according to embodiments of the present disclosure.

FIG. 1 illustrates an example environment 10 including a virtual office management system 100 operatively coupled to one or more user systems 101. In one embodiment, the virtual office management system 100 enables a user operating a communicatively connected user system (e.g., a communicatively connected computing device) to interact with the one or more interfaces associated with one or more virtual offices generated and managed by the virtual office management system 100. In an embodiment, the virtual office management system 100 generates interfaces for display to the user systems 101 which include a virtual representation of an office including one or more workspaces. According to embodiments, the workspaces can include various different types, including an office, a floor, a meeting room, a lobby, an auditorium, a support bar (e.g., an area for receiving support or help). The virtual office management system 100 is configured to generate one or more work environments (also referred to as "virtual work environments") for an entity (e.g., a company) associated with the multiple user systems 101. For example, the entity or company may have multiple physical locations (e.g., office buildings) located in different geographic areas. In this example, the virtual office management system 100 can generate a virtual work environment corresponding to each of the individual physical office locations.

According to embodiments, the virtual office management system 100 can generate a display including a virtual layout of workspaces that corresponds to a physical location. For example, the virtual layout can include a graphical representation of a collection of virtual floors of an office building, personal offices (e.g., an office workspace configured for occupation and use by an individual or user system 101, a group meeting room configured for occupation by multiple users, an auditorium, a lobby area, a cafeteria, etc.).

According to embodiments, the virtual office management system 100 includes modules configured to perform various functions, operations, actions, and activities, as described in detail herein. In an embodiment, the virtual office management system 100 includes a virtual workspace generator 112, a user manager 114, and a virtual workspace manager 116 configured to generate and manage a virtual office environment including multiple workspaces on behalf of a collection of user systems 101.

In an embodiment, the virtual office management system 100 is operatively coupled to the one or more user systems 101 via a suitable communication network (not shown). Examples of such a network include the Internet, intranets, extranets, wide area networks (WANs), local area networks (LANs), wired networks, wireless networks, other suitable networks, or any combination of two or more such networks. In one embodiment, the virtual office management system 100 includes the processing device 140 and a memory 150 configured to execute and store instructions associated with the functionality of the various components, services, and modules of the virtual office management system 100, as described in greater detail below in connection with FIGS. 1-12.

In an embodiment, the virtual workspace generator 112 of the virtual office management system 100 is configured to generate a virtual representation of the office building (or virtual work environment) including a set of multiple virtual workspaces. Example workspaces include offices, meeting or conference rooms, team rooms, auditoriums, cafeterias, support centers or bars, etc. The virtual workspace generator 112 can generate various interfaces configured to display information and representations relating to the collection of workspaces included within each office building or virtual work environment, as described in greater detail below with respect to FIGS. 2-7. According to embodiments, the virtual representation of the workspaces can be generated in accordance with input, selections, customizations, and information received by one or more of the user systems 101.

In an embodiment, the user manager 114 of the virtual office management system 100 is configured to generate a user profile or account corresponding to each of the user systems 101 associated with the virtual work environment. In an embodiment, the user profile corresponding to each user system 101 includes information defining the one or more workspaces associated with each user system 101. In an embodiment, the user profile includes information identifying each user (e.g., name, title, phone number, etc.) and an association with each of the one or more workspaces (e.g., an assignment of a user to a particular virtual work environment, an assignment of a user to a particular office, an assignment of a role of a user (e.g., a presenter, a meeting leader or organizer, a guest, etc.). In an embodiment, the user manager 114 generates, stores, and manages the user profiles based on information received from one or more administrators associated with the virtual work environment (e.g., one or more individuals having permission or authority to establish rules, permissions, assignments, etc. associated with the workspaces of the virtual work environment).

In an embodiment, the virtual workspace manager 116 of the virtual office management system 100 manages the workspaces of the virtual work environment. In an embodiment, the virtual workspace manager 116 manages the virtual workspaces generated by the virtual workspace generator 112 and the user profiles generated by the user manager 114. In an embodiment, the virtual workspace manager 116 determines access rights to a workspace, manages access to a workspace based on a status or mode of the workspace (as described in greater detail below with reference to FIGS. 4A and 4B), manages the one or more tools of each workspace (e.g., audio/visual components, layout components (e.g., shelves, customizable options of a workspace), status indicators, interactive components (e.g., chat functionality, presentation tools, etc.), as described in greater detail below.

Figure 2:
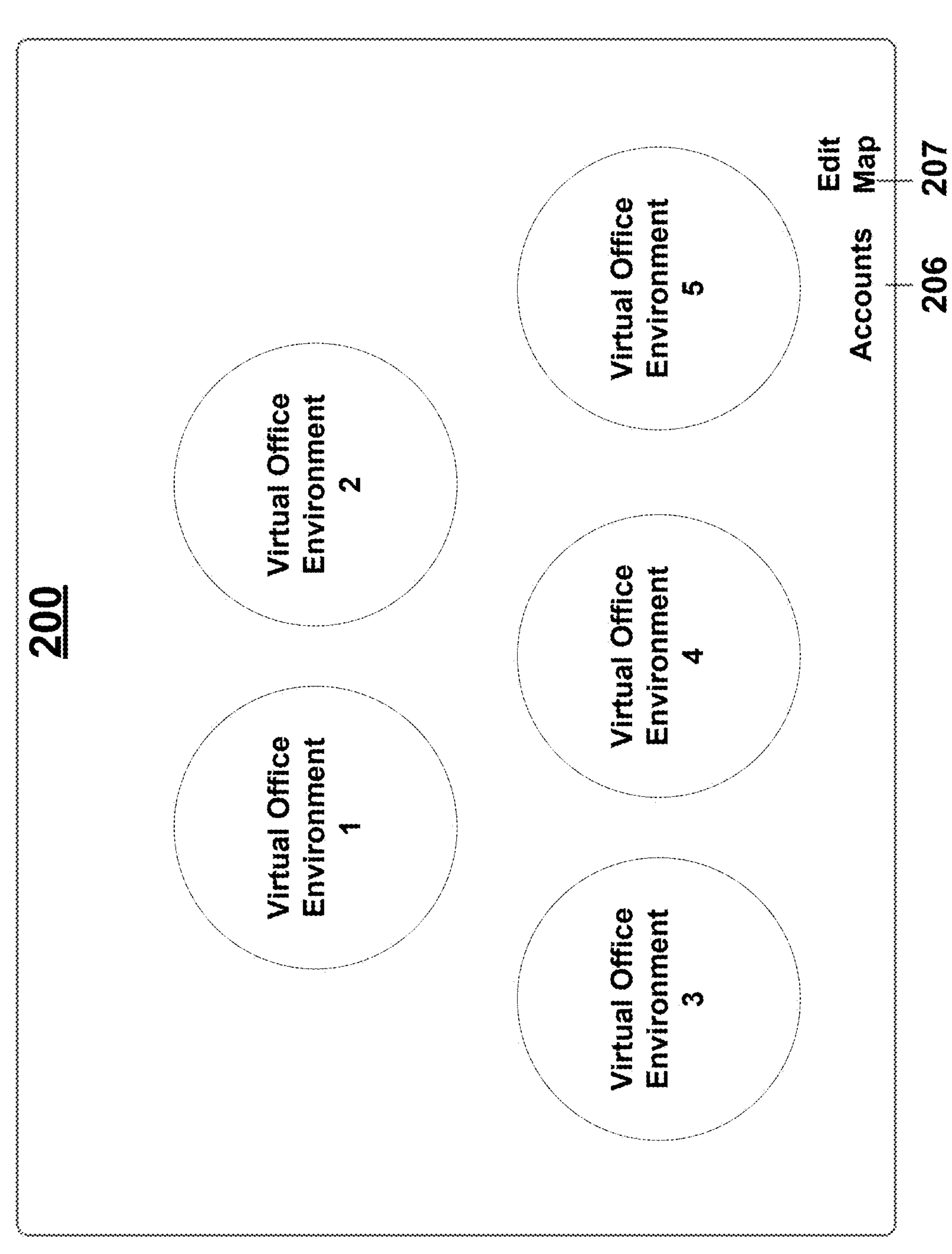
FIG. 2 illustrates an example interface displaying a virtual work environment including multiple office environments generated and managed by a virtual office management system, according to embodiments of the present disclosure.

FIG. 2 illustrates an example interface displaying a virtual work environment 200 including multiple office environments (e.g., office environments 1 through 5) generated and managed by a virtual office management system (e.g., virtual office management system 100 of FIG. 1). In the example illustrated in FIG. 2, each office environment of the virtual work environment 200 corresponds to a physical building or location associated with an entity. For example, the entity may maintain offices in five different geographic locations, such that the virtual work environment 200 generates and manages a separate virtual office environment corresponding to each location. In an embodiment, each user of a set of users associated with the entity can be associated with one or more of the virtual office environments (e.g., environment 1 through 5). As illustrated, the virtual office management system 100 generates a graphical representation of the one or more virtual work environments for display to one or more user systems 101. In an embodiment, the interface including the virtual work environment 200 can be presented to a user system to enable a user to enter one or more of the virtual office environment in accordance with access rights and privileges set forth in the corresponding user profile or account.

In an embodiment, a user system may first be presented with an overview display that does not include any particular virtual office environments. In order to gain access to one or more virtual office environments, the user system may first execute an authentication process (e.g., authenticate an email address or other identifying information (e.g., a username and password). After authentication, the interface displays the one or more virtual office environments (e.g., environments 1-5 in FIG. 2) to which the authenticated user system has access. In an embodiment, the user system can be granted a set of access rights which are associated with each of the one or more virtual office environments. For example, the authentication process can be executed and managed by the virtual workspace manager 116 of FIG. 1 to enable a user system to have access to one or more particular virtual office environments, access to one or more workspaces within the accessible virtual office environments, etc.

In an embodiment, the authentication process can include verifying that a user's identifying information is included on a list (or other data structure) associated with a particular virtual office environment. In an embodiment, the virtual workspace manager 116 of FIG. 1 can receive identifying information (e.g., an email address) associated with the user system and identify a set of one or more access rights associated with that identifying information. In an embodiment, an administrator can provide a set of identifying information (e.g., a set of multiple email addresses) to establish the associations between the virtual office environments and the user systems. In an embodiment, after the authentication process, a user system can interact with (e.g., click on) a graphical component (e.g., an icon) to enter the corresponding virtual office environment. In an embodiment, a user can rearrange the virtual office environments by clicking on an edit map button or icon 207.

According to embodiments, the virtual office management system 100 can execute a process to enable a user to access one or more virtual office environment via the interface 200. In an embodiment, the method includes navigation by a user (e.g., a user system) via a website or application to an interface displaying a virtual work environment 200. The user system can click an account icon 206 and selects an "add account" option. In the process, the user enters his or her authentication or identifying information (e.g., an email address). In response, the virtual office management system 100 sends the user system an email with a one-time use login code. In response to entry of the login code by the user system, the virtual office management system 100 authenticates the user systems and displays the one or more virtual office environments to which the user system has access. In an embodiment, the user system can click on an icon or other graphical component associated with a virtual office environment to gain entry.

Figure 3:
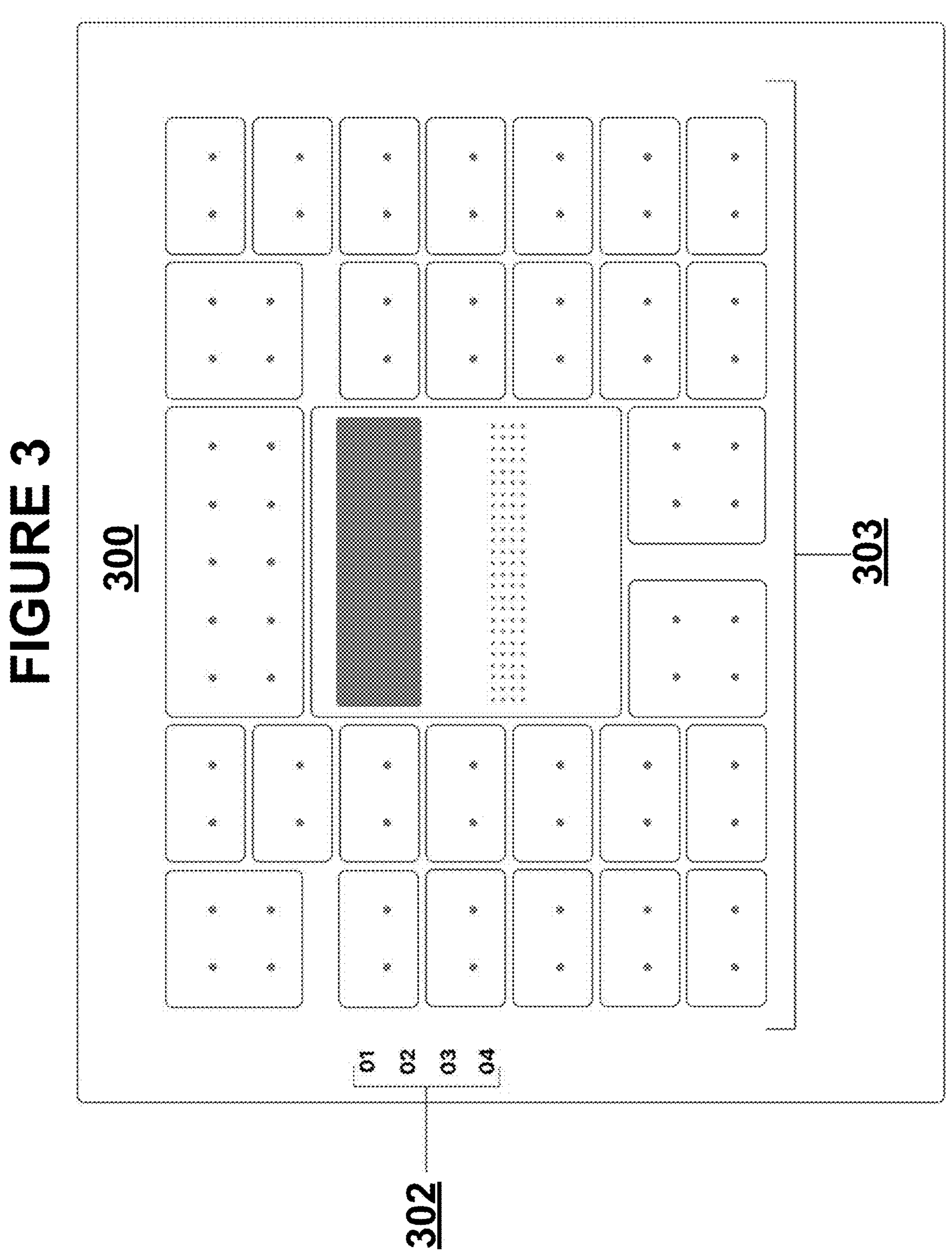
FIG. 3 illustrates an example of a virtual representation or map of an example office building or virtual work environment generated by a virtual office management system, according to embodiments of the present disclosure.

FIG. 3 illustrates an example of a virtual representation or map 300 of an example office building or virtual work environment generated by the virtual workspace generator 112 of the virtual office management system 100 of FIG. 1. In an embodiment, the map 300 is a primary interface of a virtual office environment (e.g., virtual office environment 1 through 5 of FIG. 2), where the map 300 provides a visual representation of the virtual office and places or locations (e.g., workspaces) within that office environment corresponding to the multiple user systems. The map 300 may comprise one or more floors 302, where each floor includes a set of workspaces 303.

According to embodiments, the number of floors 302 in a corresponding virtual office environment is customizable. Each floor 302 (e.g., floor 1, floor 2, floor 3, and floor 4 in the example of FIG. 3) can be assigned a name and a position within the floor order. The number of floors 302 are displayed on a portion of the map 300 such that interaction with the floor name or number (e.g., hovering over any floor number, clicking on a floor number, etc.) shows a preview of that floor, as well as the identifying information (e.g., a name) of each floor.

In an embodiment, the workspaces 303 (e.g., offices or rooms) can be added to each floor 302 in a grid layout, as shown in FIG. 3. In an embodiment, a maximum number of workspaces can be established for each floor 302 (e.g., each Floor can have a maximum of 15 grid spaces horizontally and 10 grid spaces vertically). In an embodiment, the size of each of the individual workspaces 303 is customizable (e.g., each workspace can be 1×1, 15×10, 4×4, etc.). In an embodiment, when a user system occupies a workspace on the map 300, the virtual office management system 100 generates a display including information associated with the user system (e.g., a profile picture in displayed in the corresponding workspace). In an embodiment, a user can move to occupy a different workspace within the map 300 and the virtual office management system 100 dynamically updates the graphical representation of the map 300 to reflect the movement of the user from a first position or location on the map 300 to a second or updated position or location on the map 300.

In an embodiment, the virtual office management system 100 executes a process to enable a user to add a floor 302 to the map 300. In the process, while in a virtual office environment, a user interacts with an "edit map" icon. The user is presented with options to add a floor by floor type. Example floor types include a team floor, a templated floor, or a new floor. To add a team floor, the virtual office management system 100 prompts the user to provide a floor name and a list (e.g., a comma or line separated list) of email address of users that are to be added to the floor. In response, the virtual office management system 100 generates and creates the new floor, with a workspace (e.g., an office) for each team member and, optionally, adds one or more additional workspaces to the floor (e.g., a conference room, a reception area, etc.).

In an embodiment, the virtual office management system 100 enables the user to add a floor using a template. In this embodiment, the virtual office management system 100 prompts the user to provide a floor name and receives a selection from the user of one or more pre-defined floor templates. Each template can include a different collection and arrangement of multiple workspaces (e.g., a number of user offices, a number of conference rooms, a reception area, an auditorium, etc.). Based on the selected template, the virtual office management system 100 creates a new floor. In an embodiment, the virtual office management system 100 places the user in a reception area on the newly created floor and displays an interface including an "edit map" feature for that floor to enable the user to customize the workspaces of the templated floor. In an embodiment, the virtual office management system 100 enables the user to add a "blank" floor that can be fully customized by the user to add and arrange the workspaces of the new floor.

According to embodiments, the virtual office management system 100 provides functionality to enable a user to edit a floor plan or map. In an embodiment, while on a floor in a virtual office environment, the user can interact with an "edit map" option and delete a workspace from the floor. In an embodiment, the virtual office management system 100 enables the user to move a workspace from a first position on the floor to a second or updated position on the floor (e.g., by clicking and dragging the workspace). In an embodiment, the virtual office management system 100 enables the user to change or adjust a size of a workspace. In an embodiment, the virtual office management system 100 enables a user to add a new workspace to the floor, where the user can select the workspace type (e.g., user office, meeting room, auditorium, etc.)

According to embodiments, the user manager 114 of the virtual office management system 100 of FIG. 1 establishes the user profiles associated with each virtual office environment. In an embodiment, the virtual office management system 100 establishes a list of authorized user that can enter a virtual office environment. The users can be categorized as a member of the virtual office environment or a guest of the virtual office environment, such that each user type is associated with a different set of rights, privileges, and levels of access to features and functionality.

In an embodiment, the user manager 114 enables a user (e.g., an administrator) to establish a user as a member having a first level of rights or access to one or more virtual office environments. In an embodiment, the first level of access can include one or more of a right to access any floor of the virtual office environment, a right to enter any "open" workspace in the virtual office environment, a right to submit a "knock" or entry request to one or more workspaces in the virtual office environment.

In an embodiment, the user manager 114 can assign a "seat" or "office" in the virtual office environment to a member (e.g., a maximum of one seat or office per floor), including a default seat or office within the virtual office environment. In an embodiment, when a member enters a virtual office environment, the user is automatically placed by the virtual workspace manger 115 in a default or assigned seat or office, in accordance with the user profile or account established by the user manager 114.

In an embodiment, the user manager 114 can establish a user as a guest of a virtual office environment. In an embodiment, a user that is designated as a guess must be invited by a host (e.g., a member of the virtual office environment). The guest is assigned a second level of rights or access with respect to the virtual office environment, which is a lower level of rights as compared to the first level associated with a member. For example, the second level of rights may indicate that the guest is not authorized to move freely between floors (e.g., without permission), the guest is authorized to enter a workspace only if the host-member is already located within that workspace, etc. In an embodiment, a host-member can interact with the virtual office management system 100 to cause a guest to be brought into a workspace, cause a guest to be removed from a workspace (e.g., ending a guest's visit to the workspace), cause a guest to be removed from the virtual office environment, etc.

In an embodiment, when a guest enters a virtual office environment, the virtual workspace manager 116 notifies the member-host that their guest has arrived. Similarly, the virtual workspace manager 116 can notify the guest that the member-host has been alerted to their presence (e.g., a notification indicating the guest is in a lobby or reception area of the virtual office environment).

Figure 4B:
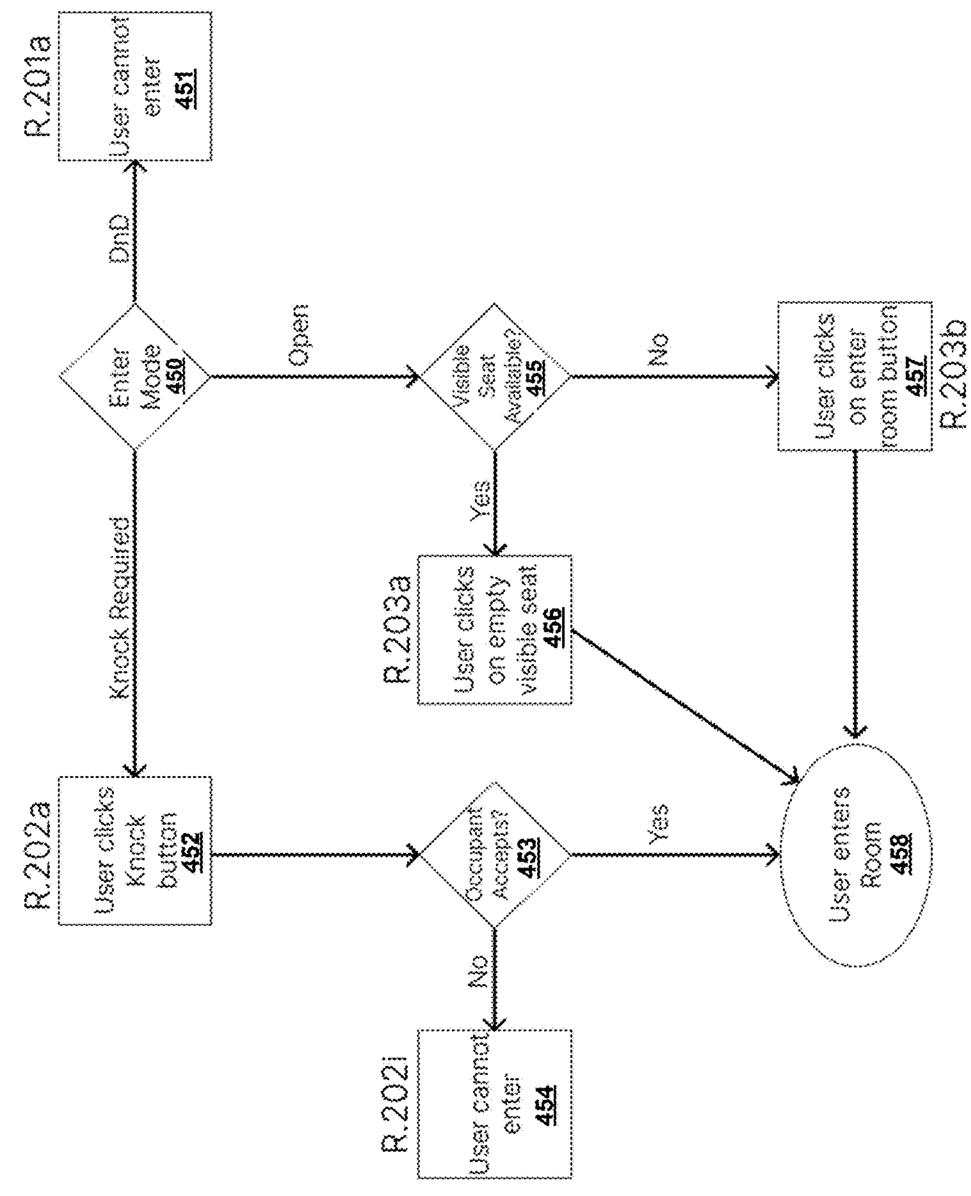
FIGS. 4A and 4B illustrate example process flows relating to generation and management of a workspace of a virtual office environment by a virtual office management system, according to embodiments of the present disclosure.
Figure 4A:
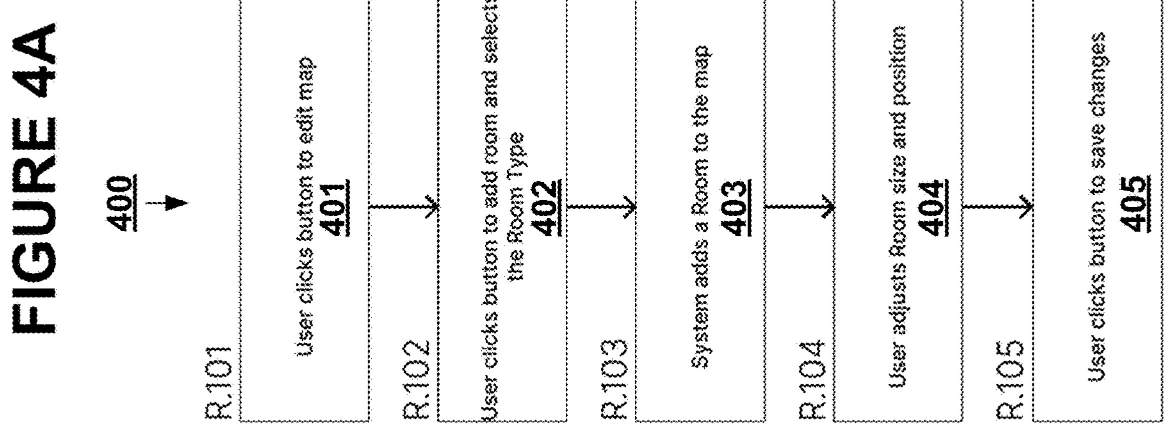

FIGS. 4A and 4B illustrate process flows relating to the generation and management of a workspace of a virtual office environment by the virtual office management system 100. A workspace in the virtual office environment is a virtual representation of a physical or real-world room. The workspace can be generated to include one or more visible virtual seats (e.g., locations within the workspace that can be occupied by a user). In an embodiment, a user may enter the workspace by clicking on the workspace on the map and occupy a seat. In an embodiment, the virtual office management system 100 may not limit or constrain the capacity of a workspace by a number of visible seats represented in the workspace.

In an embodiment, a user may input a name or other identifying information for the workspace. FIG. 4A illustrates a process 400 executed by the virtual workspace generator 112 of the virtual office management system 100 of FIG. 1 to generate a workspace in a selected virtual office environment. In operation 401, a user (e.g., an administrator) selects or clicks a button or icon to edit a map associated with the virtual office environment. In operation 402, the user submits an indication (e.g., clicks a button) associated with adding a workspace and selects a workspace type (e.g., meeting room, office, team room, auditorium). In operation 403, the virtual office management system 100 adds a new workspace to the map in accordance with the selection made by the user in operation 402.

In an embodiment, in operation 404, the virtual office management system 100 can receive one or more inputs or commands from the user relating to the workspace, including adjustments to the workspace size, position within the map, number of seats within the workspace, etc. In operation 405, the virtual office management system 100 receives an indication from the user to store the updated map including the workspace and corresponding workspace information (e.g., type, size, position, location, etc.). In an embodiment, the virtual office management system 100 stores the changes and returns the user to the map, where the new workspace is displayed in the virtual office environment. It is noted that process 400 can be executed to enable a user to edit an existing workspace (e.g., by performing operations 401, 404, and 405).

According to embodiments, the virtual office management system 100 enables each workspace to be associated with a mode or status. Example workspace modes include an "open" mode, a "knock required" mode, or a "do not disturb" mode. When in the "open" mode, another user can enter the workspace by clicking on the workspace. When in the "knock required" mode, another user who wishes to enter the workspace is required to submit a "knock" or request (e.g., by clicking a button) to alert the one or more occupants of the workspace or the entry request. In an embodiment, the user can be granted access by the one or more occupants of the workspace in response to the knock request. In an embodiment, a workspace can be placed in a "do not disturb" mode where no other user can enter the workspace or submit a knock request.

In an embodiment, the virtual workspace manager 116 can automatically enable a communication connection (e.g., a video call, an audio call, a chat interaction, etc.) between multiple users when those multiple users occupy a workspace at the same time. In an embodiment, the virtual workspace manager 116 can establish a type of communication connection depending on a type of the workspace having the multiple occupants. In an embodiment, the workspace types can include, but are not limited to, a meeting room, an office, a team room, and an auditorium, as described in greater detail with reference to FIG. 4B.

FIG. 4B illustrates an example process flow relating to the management by the virtual office management system 100 of entry by a user into a workspace based on a corresponding mode or status of the workspace. In an embodiment, a user may elect to attempt to enter a workspace that has one or more current occupants. At operation 405, the virtual office management system 100 determines a mode or status associated with the target workspace. If the workspace is in a "do not disturb" mode, the process flow continues to operation 451 and the virtual office management system 100 determines that the user may not enter the workspace or submit a knock request. If the workspace is in a "knock required" mode, the user may submit a "knock" request (e.g., click on a "knock" button) at operation 452. In response, at operation 453, one or more of the workspace occupants determines whether to accept the entry request to enable the user to enter the workspace (at operation 458) or denies the entry request to block the user from entering the workspace (at operation 454).

In an embodiment, if the workspace is in an "open" mode, the virtual office management system 100 allows the user to enter the workspace and determines if one or more visible seats within the workspace are available, at operation 455. If a seat is available, the user may click on an empty visible seat at operation 456 and the user enters the workspace, at operation 458. In an embodiment, if there are no visible seats available in the workspace, the user may click on "enter room" button at operation 457 and is entered by the virtual office management system 100 into the workspace at operation 458. In an embodiment, the virtual office management system 100 updates the map of the virtual office environment to provide a visual indication that the user entered into the workspace. In an embodiment, upon entry into the room, the virtual office management system 100 may automatically establish a communication channel or mode between the occupants of the workspace (e.g., a video communication channel, an audio communication channel, a chat communication channel). In an embodiment, the virtual office management system 100 may select the type of communication channel based on the workspace type (e.g., if the workspace is a team room, the virtual office management system 100 may automatically launch a video conference channel including all of the occupants of the team room).

Figures 5A, 5B:
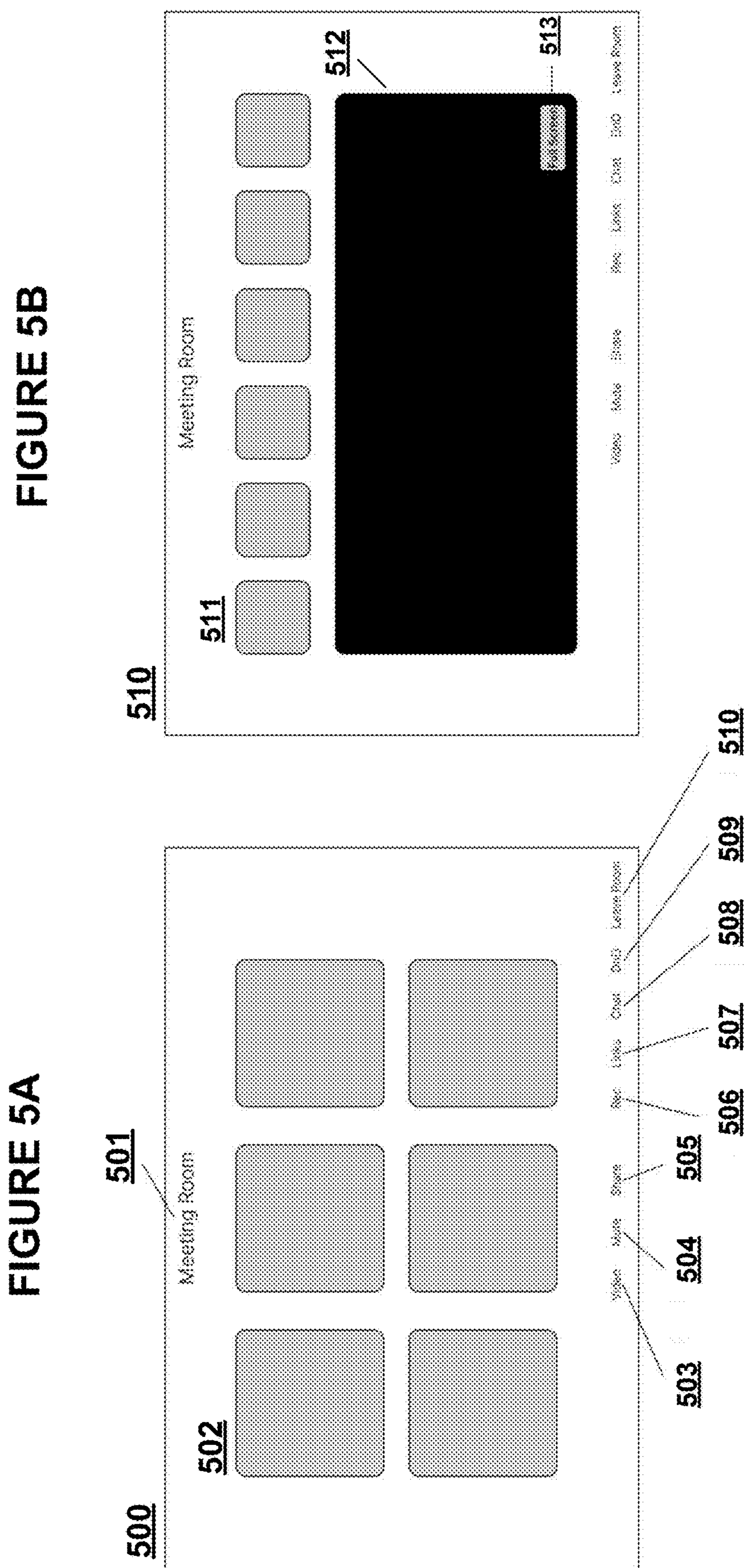
FIG. 5A illustrates an example meeting room generated by a virtual office management system, according to embodiments of the present disclosure.
FIG. 5B illustrates an example meeting room with a shared user screen, according to embodiments of the present disclosure.

FIG. 5A illustrates an example meeting room 500 generated by the virtual office management system 100, in accordance with embodiments of the present disclosure. In an embodiment, the meeting room is a virtual space for video conferencing between multiple users. In an embodiment, when two or more users are present in the same meeting room 500, the virtual office management system 100 executes video conferencing functionality to establish a video connection between the multiple users. In an embodiment, the virtual office management system 100 enables one or more of the users in the meeting room 500 to share his or her screen with the other occupants. In an embodiment, when a user enters the meeting room 500, the virtual office management system 100 generates an interface including a visual representation of the meeting room 500, such as the example shown in FIG. 5A. In an embodiment, the meeting room 500 can be opened with one or more default settings, such as a setting that no content is shared and a meeting chat functionality is hidden or disabled.

In an embodiment, while in the meeting room 500, a room name 501 may be generated and displayed to the one or more users. In an embodiment, the meeting room 500 interface may include a gallery or grid 502 of video feeds corresponding to the meeting room occupants. In an embodiment, the virtual office management system 100 may automatically adjust a size of the respective video feeds in the gallery as the number of occupants changes (e.g., by users entering and leaving the meeting room 500). In an embodiment, the interface may include a toolbar including a set of tools or functions associated with the meeting room 500. For example, the toolbar may include a "video" button 503 to enable a user to control a corresponding video feed (e.g., start and stop their video). In an example, the toolbar may include a "mute" button 504 to enable a user to mute or unmute a corresponding audio feed. In example, the toolbar can include a "share" button 105 to enable a user to share his or her screen or open a board.

In an example, the toolbar may include a "rec" or "record" button 106 to enable a user to initiate or stop a recording of a conversation in the meeting room 500. In an example, the toolbar may include a "links" button 507 to open a menu including one or more links, described in further detail below. In an example, the toolbar may include a "chat" button 508 to turn on or off a meeting chat feature. In an example, the toolbar may include a mode button 508 (labeled as "DnD" or do not disturb in FIG. 5A) to change a mode or status of the meeting room (e.g., change between modes including "enter", "DnD", or "knock required" modes. As illustrated, the mode button 509 can display a current mode of the meeting room (e.g., DnD). In an example, the toolbar may include a "leave room" button 510 to enable a user to leave the meeting room 500.

FIG. 5B illustrates an example meeting room 510 when a user is sharing their screen, according to embodiments. As illustrated, in the screen-sharing mode, each user views an updated content of the meeting room 510. As shown, the user gallery 511 is re-positioned by the virtual office management system 100 and the video feed sizes are reduced. In this example, the content being shared is displayed via the interface. Any user viewing the screen share can view it in full screen by clicking a "Full Screen" button 512.

In an embodiment, the virtual office management system 100 can generate an office workspace type. In an embodiment, the office can be generated with a default setting as an audio-only virtual room where a user can be assigned seats. In an embodiment, an office is a workspace type that can be placed on a map and inherit features and settings associated with an office workspace type. In an embodiment, any visible seat in an office may be assigned to any member of the Roam. In an embodiment, if a seat is assigned, only the assignee may occupy it. When two or more users are present in the same office, those users connected by the virtual office management system 100 in an audio-only conversation. Additionally, a user may choose to share their screen or share a board. In an embodiment, an office may be placed in one of two modes—the "knock required" mode or the "do not disturb" mode.

In an embodiment, the virtual office management system 100 can generate a team room workspace type. In an embodiment, the team room is a derivative of an office, and may inherit the features and settings of an office. In an embodiment, the team room may be set to the "enter" mode, the "knock required" mode or the "do not disturb" mode.

Figures 6A, 6B:
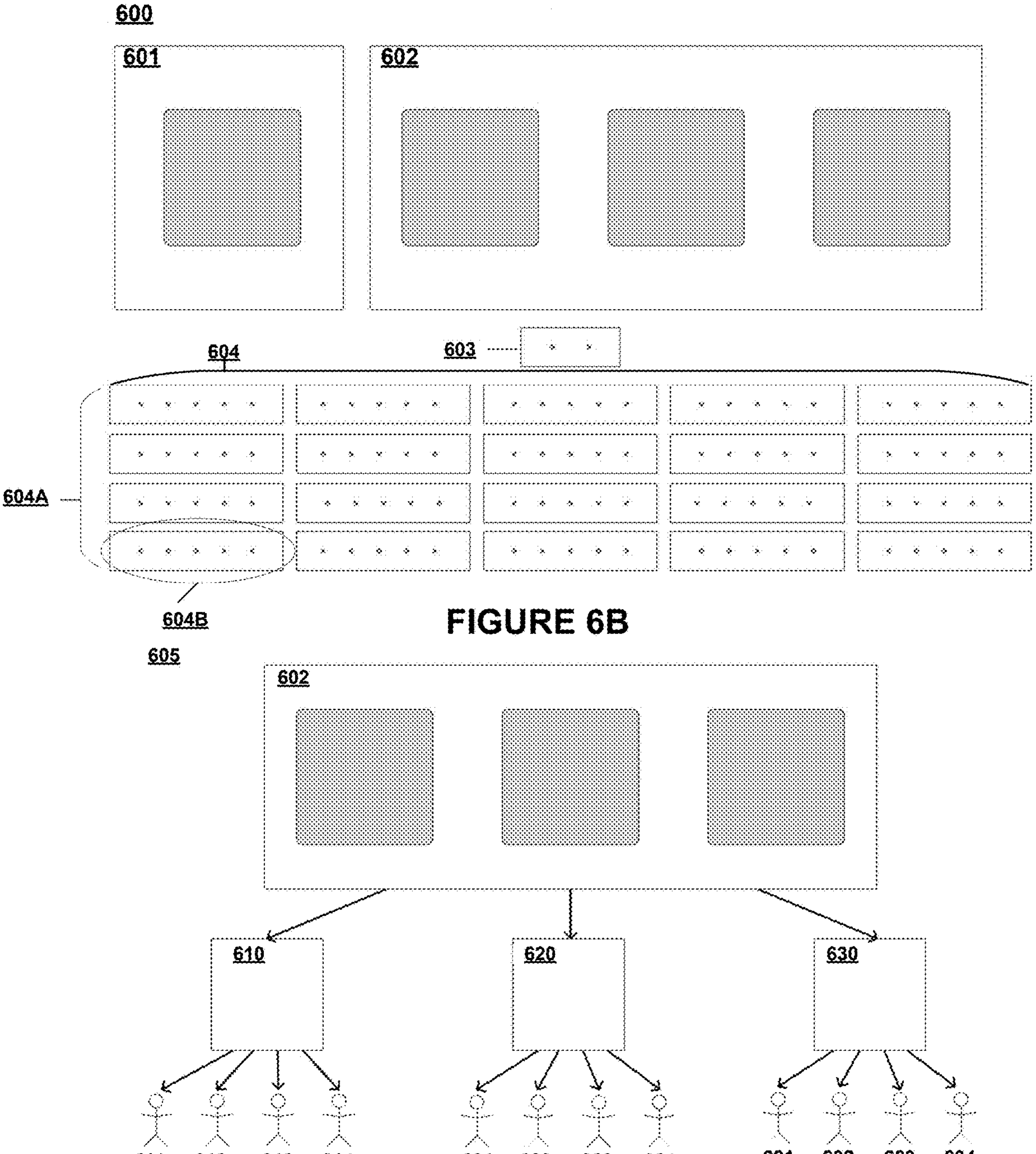
FIGS. 6A and 6B illustrate examples of an auditorium generated and managed by a virtual office management system, according to embodiments of the present disclosure.

FIG. 6A illustrates an example auditorium workspace type generated by the virtual office management system 100, according to embodiments. As shown, the auditorium 600 is a virtual room designed for presentations with a clear separation between presenters and audience members. In an embodiment, the auditorium 600 is a workspace type that can be made accessible via a map of the virtual office environment and inherit settings and functions of a room. The auditorium 600 can have multiple locations, each of which have their own functionality. Example locations within the auditorium 600 include a backstage 601, a stage 602, an audience section 604, and a question and answer section 603. In an embodiment, the stage 602 is a primary focus of the auditorium 600 interface. A user on the stage 602 can be placed in a video conversation, and anyone in any location in the auditorium 600 can view and hear that conversation. In an embodiment, users located in the stage 602 section can share their screen or control a board, which everyone in the auditorium 600 can view.

In an embodiment, the backstage section 601 is a preparation area for users prior to going into the stage section 602. Users in the backstage section 601 may be placed in a video communication, an audio communication, or a chat communication with each other. In an embodiment, the users on stage 602 can see the users in the backstage section 601, but do not receive an audio feed of the backstage section 601 (e.g., the backstage audio is muted with respect to the users on the stage 602). According to embodiments, no other users in the auditorium (e.g., the users located in question and answer section 603 or the audience section 604) can view or hear users in the backstage section 601. When a user is in the backstage section 601, that user can see and hear the one or more users located in the stage section 602, but the audio is reduced or lowered (i.e., the audio is ducked) by the virtual office management system 100. In an embodiment, the one or more users in the backstage section 601 can share their screen or control the board, which everyone in the auditorium 604 can view.

In an embodiment, the audience section 604 is the location for the one or more users who are being presented to. The audience section 604 may be broken up into smaller sections 604A including a subset of users (e.g., a subset of 50 users, a subset of 100 users, etc.), which may be are further divided into one or more smaller sub-sections or pods 604B (e.g., sub-sections of 2, sub-sections of 5, etc.) As more users join the audience 604 and more sections 604A are needed, the virtual office management system 100 automatically scales up the number of sections. In an embodiment, audience members do not stream their video. In an embodiment, the virtual office management system 100 can enable the users in the audience to engage in conversation (e.g., audio or chat) with members in the same sub-section or pods 604B by interacting with a "whisper" button, which causes the virtual office management system 100 to reduce or lower the audio on stage 602 for everyone in the corresponding sub-section or pod 604B. Additionally, when there is no user is located in the stage section 602, audience members in the same sub-section or pod 604B may be connected in a conversation (e.g., an audio conversation, a chat conversation, etc.).

In an embodiment, the virtual office management system 100 may provide a question and answer (Q&A) section 602 to enable users to ask a question to the presenters. The presence of the Q&A section or location 603 can be toggled on or off by users on the stage 602 or backstage 601. For example, when a user enters the Q&A location 603, the one or more users are placed by the virtual office management system 100 in a queue behind any users who were already located in the Q&A location 603. In an example, the user at the front of the queue is connected in an audio conversation, which everyone else in the auditorium 600 can hear. In an embodiment, the video associated with the user located in the Q&A location is disabled. When that user leaves the Q&A location 603, all users in Q&A section 603 move up one place in the queue, and the new user located at the front of the queue is connected in an audio conversation with the users in the auditorium 600.

For example, the virtual office management system 100 can implement the auditorium 600 such that the different sections or locations are associated with the following features and functions, as shown in the example in the following table (Table 1):

TABLE 1

| Location | Video Enabled | All Occupants Can Hear/See You | Communicate Only to Occupants of Your Location | Share Screen/ Control Board |
|---|---|---|---|---|
| Stage | ✓ | ✓ | | ✓ |
| Backstage | ✓ | | ✓ | ✓ |
| Audience | | | ✓ | |
| Q&A | | ✓ | | |

In an embodiment, the virtual office management system 100 transmits the video conversation of the one or more users located on the stage 602 to other occupants of the auditorium 600 via a system of nodes, as shown in FIG. 6B. In an embodiment, the conversation is replicated to one or more server nodes, and the users in the backstage section 601, the audience 604, and the Q&A section 603 connect to these replica nodes. In an embodiment, the virtual office management system 100 may automatically determine how many users can be connected to a given node based on level of CPU usage. This allows greater scalability, as the load is spread across many different computing devices and machines.

In an embodiment, the virtual office management system 100 can replica the stage conversation using a series of nodes, as shown in FIG. 6B. In this example, the users in the stage section 602 are engaged in a conversation (e.g., an audio feed). The virtual office management system 100 replicates that conversation to nodes 610, 620, and 630. In an embodiment, the virtual office management system 100 determines, based on CPU usage, a threshold number of users (in the audience section 604) that are to be connected to each replica node. For example, the virtual office management system 100 may determine a current CPU usage level of each node in the set of replica nodes then determines a threshold number of user to be assigned or allocated to each particular node. In the example shown in FIG. 6B, based on a first CPU usage level of a first node 610, a second CPU usage level of a second node 620, and a third CPU usage level of third node 620, the virtual office management system 100 determines that four users are to be assigned to each node. As shown in the example of FIG. 6B, users 611, 612, 613, and 614 are assigned by the virtual office management system 100 to node 610; users 621, 622, 623, and 624 are assigned by the virtual office management system 100 to node 620; and users 631, 632, 633, and 634 are assigned by the virtual office management system 100 to node 630.

Figure 7:
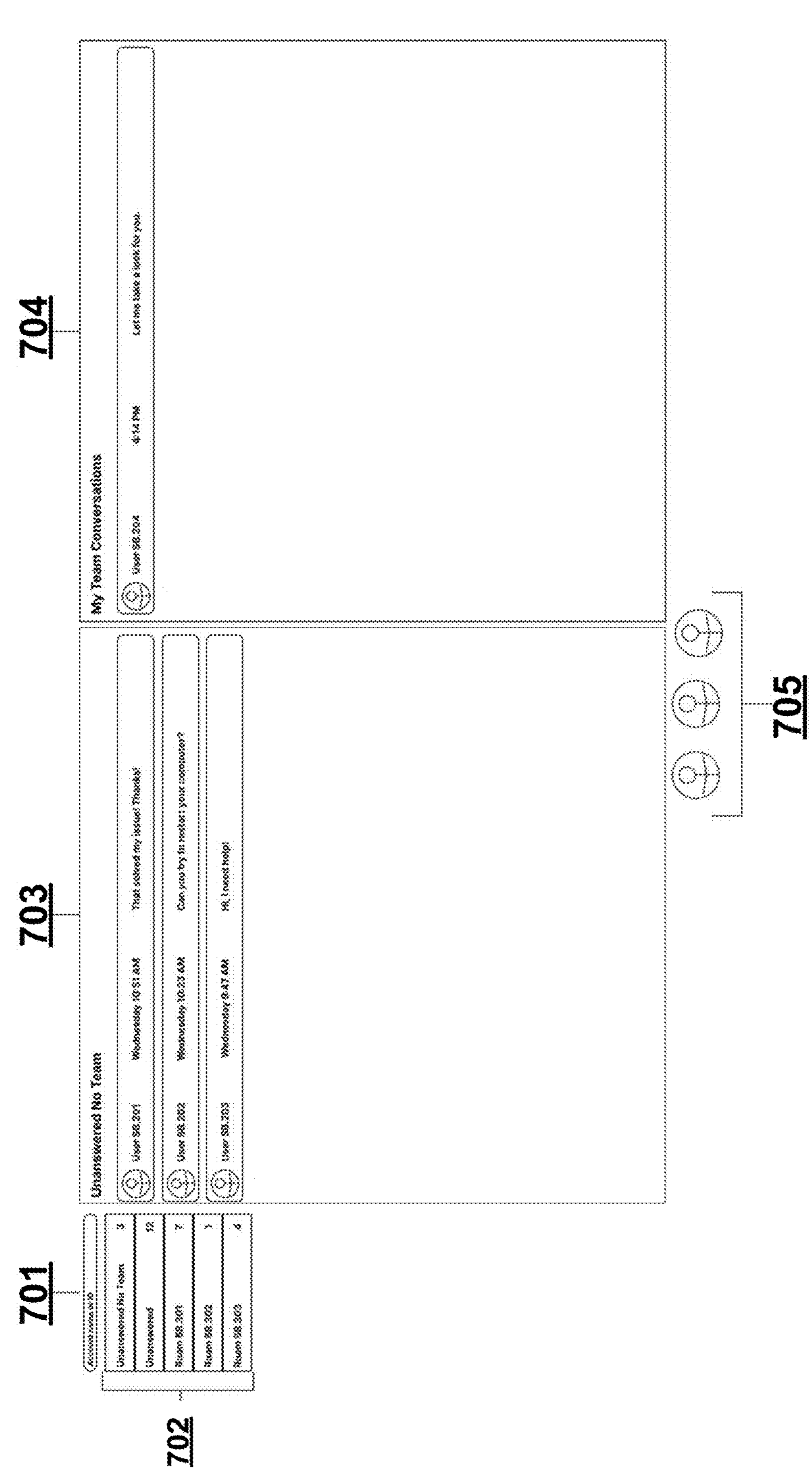
FIG. 7 illustrates an example interface including a support bar section of a virtual office environment to provide customer support to one or more users, according to embodiments of the present disclosure.

FIG. 7 illustrates an example interface including a support bar section of a virtual office environment to provide customer support (e.g., technical support) to one or more users. In the example shown, a user may access the support bar and engage in a communication (e.g., a chat) with a support bar member. In an embodiment, instead of a ticketing system, the virtual office management system 100 provides the support bar workspace type, which may inherit features of a room workspace type.

In an embodiment, the support bar may be structured to enable users to initiate a with a member of the virtual office environment support team. In an embodiment, the virtual office management system 100 provides the support bar to organize all support requests and collaboration with members of the support bar with regard to the support requests. In an embodiment, the support bar interface includes a first section including a list of support categories 702, a search field associated with the support categories 701, a list of chats corresponding to a particular category 703, and a list of chats associated with one or more support teams 704 to which a particular member belongs.

According to embodiments, the list of categories 702 indicates a number of unanswered chats associated with one or more users. For example, the categories may include unanswered chats that do not have an associated support team, a total unanswered chats, and a category for each user. As shown, the list of categories can be searched using the search field 701.

As shown in FIG. 7, the panel 703 displays the list of chats associated with a particular category. The interface can include an indicator representing a number of unanswered chats in a particular category. In an embodiment, each row within panel 703 represents a chat conversation with a user. The information displayed for row may include a user profile image, a user name, a time of a most recent message, and a preview of a most recent message. In an embodiment, the panel 704 displays the list of chats associated with a team including a particular support member. The information that may be displayed per chat in panel 704 may be the same as in panel 703.

In an embodiment, when a user enters the support bar, the user is automatically entered into an audio conversation with one or more other users currently in the support bar. In an embodiment, the support bar includes a section 705 having information (e.g., a profile image) identifying each user currently in the support bar conversation.

In an embodiment, a user may click on any chat preview to access one or more interaction options associated with the chat. For example, the interaction options may include a "mark answered" option (e.g., mark the chat as answered, removing it from any categories that only show unanswered chats), a "join/leave team" option (e.g., a user can join a team for a given chat to enable the user/member to engage in chat functionality and determines which chat messages are displayed in panel 704), a "manage team" option (e.g., launches a window where a member can add and/or remove other members from the team for that chat).

According to embodiments, the virtual office management system 100 generates a meeting or group chat interface and functions for all occupants of a workspace (e.g., a meeting room, an auditorium, etc.). In an embodiment, any workspace occupant can toggle the chat on or off for themselves with the press of a button, without disabling the chat functionality for the other occupants of the workspaces. The virtual office management system 100 provides the meeting chat to enable users to send messages to the chat (e.g., messages containing text, images, emojis, etc.). In an embodiment, if a user sends an emoji to the meeting chat, that emoji displays for a few seconds on the photo of the space the user occupies (e.g., on the map, in the auditorium, etc.) and, if applicable, the emoji is displayed over the user's video stream (e.g., in a meeting room, on the stage of the auditorium, etc.).

According to embodiments, the virtual office management system 100 generates and provides "board" or "whiteboard" functionality, where the board feature provides a shared canvas for users to collaborate while engaged in conversation (e.g., a video communication, an audio communication, a chat communication) in a workspace. The virtual office management system 100 can add a board to various workspaces. When a board is active, users in the conversation can upload media (images, video files, audio files) or add a text note. In an embodiment, one or more objects can be placed on the board and any user who can control the board can change a position of the one or more objects on the board, resize the objects, remove an object from the board, etc. A user may save or store a board for use later. If a user has a saved board, the user may load that board into a workspace that the user has entered. In an embodiment, when a user interacts with the board (e.g., moves a cursor indicator over the board), all users viewing the board can see an indicator showing a position of the user's cursor.

Figures 8A, 8B:
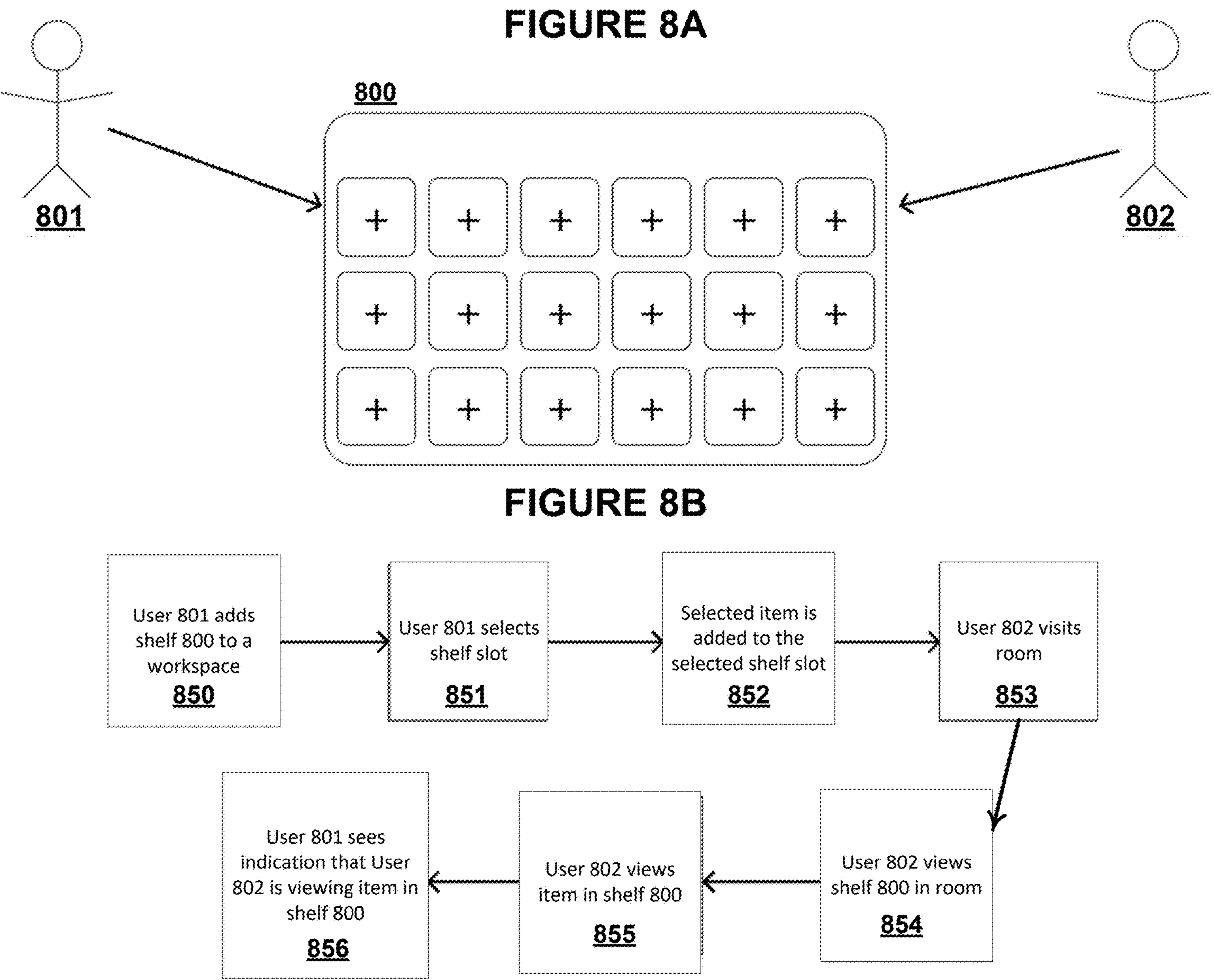
FIG. 8A illustrates an example shelf portion of a workspace generated by a virtual office management system, according to embodiments of the present disclosure.
FIG. 8B is a diagram illustrating an example process, executed by a virtual office management system, to enable a user to generate and manage a shelf in a workspace of a virtual office environment, according to embodiments of the present disclosure.

FIG. 8A illustrates an example shelf portion 800 of a workspace generated by the virtual office management system 100, according to embodiments. The shelf portion (or "shelf") 800 is a customizable virtual space for displaying one or more items in a workspace. Example items include, but are not limited to, an image, a book, a music file, a video, a link to a file, a PDF file, a non-fungible token (NFT), etc. The one or more items on the shelf 800 can be viewed by one or more other users (e.g., user 802) when the other user views the workspace including the shelf 800. The item may be associated with a link to enable another user (e.g., user 802) to view an image associated with the item and interact with the link for further interaction with the item (e.g., play a video, view a larger version of a photo, listen to a song, etc.).

A shelf 800 can be added to a workspace by a user 801 (e.g., a user's office, a team room, etc.) The shelf can include one or more shelf slots (where each available slot is represented by the "+" or add sign of shelf 800), each of which can contain an item. In an embodiment, the arrangement of items on the shelf 800 (i.e., the position of each item in the shelf arrangement is stored by the virtual office management system 100). For example, an item placed in the upper rightmost slot appears in the upper rightmost position in the shelf. In an embodiment, shelf slots are stored in association with a workspace (e.g., shelf 800 is stored in a particular workspace) or stored in association with a user profile (e.g., shelf 800 is stored as part of user ABC's profile, such that the shelf can be displayed if the user changes workspaces). In an embodiment, if a user (e.g., user 801) is associated with multiple offices with an assigned seat, the user can import their shelf from one workspace to another.

FIG. 8B is a diagram illustrating an example process, executed by the virtual office management system 100, to enable a user to generate and manage a shelf (e.g., shelf 800 of FIG. 8A) in a workspace. The process can be executed by processing logic of the virtual office management system

100 to provide interfaces and functionality to receive inputs and commands from a user to generate and manage a shelf including one or more items. In operation 850, a user (e.g., user 801 of FIG. 8A) adds a shelf (e.g., shelf 800 of FIG. 8A) to a workspace. In operation 851, the user 801 selects a slot (e.g., a position on the shelf, as represented by a "+" indicator in FIG. 8A) to add an item to the shelf. In operation 852, the user 801 selects an item to add to the selected shelf slot. In an embodiment, the user 801 may select an item from a list of items provisioned by the virtual office management system 100 in response to selection of the shelf slot. In an embodiment, the selectable items that can be added by user 801 can include, but are not limited to, a link, image, or file associated with various types of media (e.g., a movie, a book, music, a photo, a video, a social media account, NFTs, etc. According to embodiments, the virtual office management system 100 can receive information identifying the item from the user 801 and execute a search and retrieval of the item from a third-party system or library of items maintained by the virtual office management system 100. In an embodiment, the virtual office management system 100 can receive the item from the user system associated with the user 801 (e.g., an upload from the user system including the file, photo, etc.).

In operation 853, another user (e.g., user 802 of FIG. 8A) can enter or visit the workspace of user 801 and, in operations 854 and 855, user 802 views the shelf 800 and the one or more shelf items. In operation 855, user 802 can view or interact with a particular item on the shelf by clicking on or otherwise providing an indication associated with the item. In an embodiment, the "viewing" or selection of an item by user 802 can cause the virtual office management system 100 to present an enlarged display of the selected item, initiate playback of the item (e.g., play a video, play a movie, play a song, open a book, etc.). In operation 856, the virtual office management system 100 can provide an indication or notification to user 801 that user 802 is viewing the item on the shelf.

Figure 9:
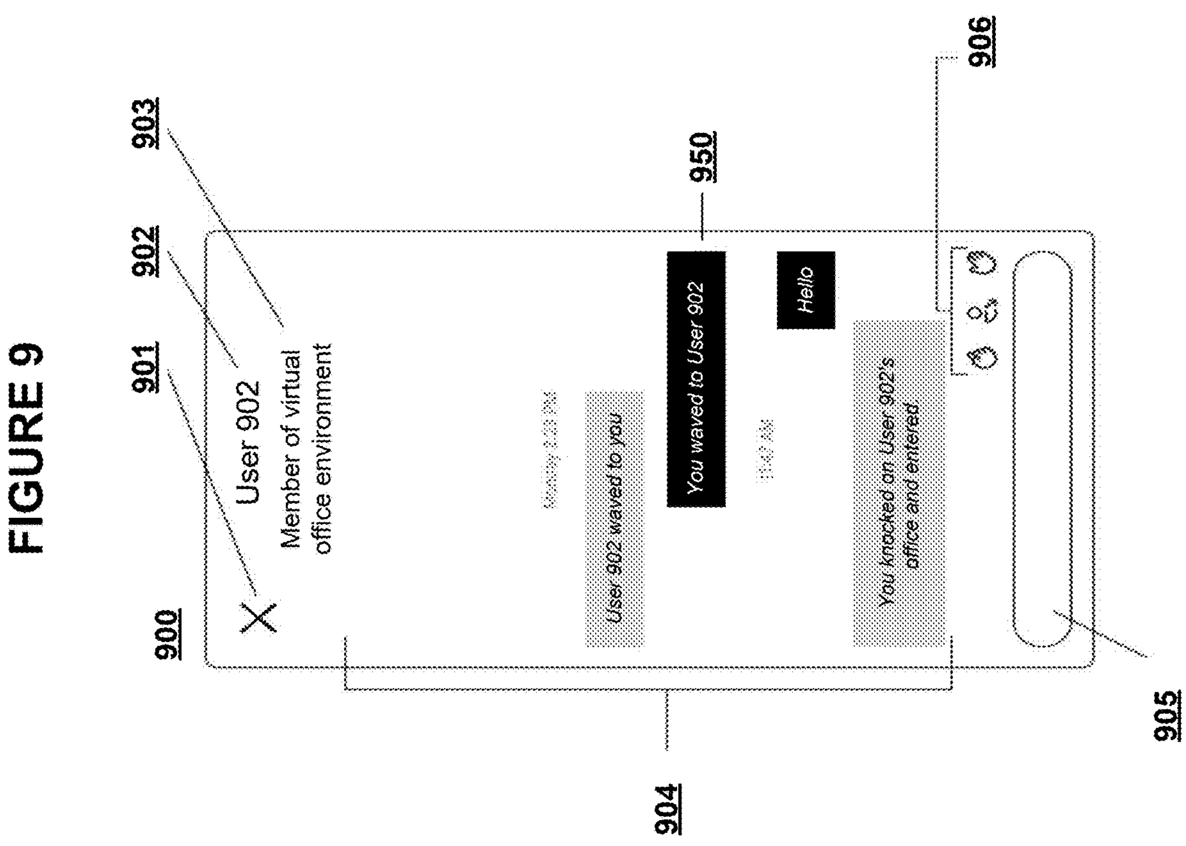
FIG. 9 illustrates an example interface corresponding to an interaction or chat display generated by a virtual office management system, according to embodiments of the present disclosure.

FIG. 9 illustrates an example interface corresponding to an interaction or chat display generated by the virtual office management system 100. According to embodiments, the virtual office management system 100 generates an interface 900 to enable users to interact with one another on the map, with the available actions being determined by the contextual state of the users engaged in the interaction. In an embodiment, in response to a user 902 interacting with another user 950 (e.g., clicks on the other user's image on the map, clicks on a video feed in a video conversation, etc.), the virtual office management system 100 generates the interaction interface 900 window to enable user 902 and user 950 to engage in an interaction. In an embodiment, a top section of the interaction window displays information associated with user 902 (e.g., user 902's name, whether user 902 is a member of the virtual office environment or a guest of the virtual office environment 903, etc.). Additionally, the user 902 or the user 950 may close out of the interaction window by clicking the "X" 901 in the upper left corner of the interface 900.

In the example shown in FIG. 9, a middle portion of the interaction interface 900 displays an interaction history 904 between the users 902 and 950. The interaction history may include previous interactions initiated by either user and direct chat messages sent between the users. Before each group of interactions, the virtual office management system 100 displays a date and time of the interactions. A bottom portion of the interaction interface 900 contains a textbox 905. If User 950 types text into this box and clicks "enter", the virtual office management system 100 sends a direct chat message to user 902. In an embodiment, the messages may include one or more images or emojis selected from an example list of icons 906. In an embodiment, hovering above an icon in the list 906 can generate a display of an associated description. In an embodiment, the specific interactions displayed in the list 906 are determined by the virtual office management system 100 based on a context or state of the users 902 and 950. users. An example interaction includes a wave interaction. The wave interaction is available to all users and notifies the target user the name of the user who waved to them. Another example interaction is an "invite here" interaction. The invite here interaction is available to all members of a virtual office environment and causes an invited user to receive a notification that they are invited to a room, which they can accept or reject. In an embodiment, in response to acceptance of the invitation, the virtual office management system 100 automatically moves the user into the appropriate workspace associated with the invitation.

Another example interaction includes a "knock" interaction. A knock interaction may be made available to all members of a virtual office environment as long as the target user is not in a workspace that is in the "do not disturb" mode. In an embodiment, the knock interaction can be made available to a guest with respect to that guest's host. In an embodiment, the knock interaction can create a notification and issue an alert (e.g., an audio alert) to the target user that another user is requesting entry into a workspace. The target user can decide to allow the user to enter or deny entry. If the user allows entry, the knocking user is automatically moved by the virtual office management system 100 into the appropriate workspace.

Another example interaction includes a "bring to me" interaction. The bring to me interaction can be made available to a member for his or her guest. In response to selection of the bring to me interaction, the virtual office management system 100 causes the guest to be placed in the other user's (i.e., the member's) current workspace. Another example interaction includes an "end visit" interaction. The end visit interaction is made available to a member for his or her guest. In an embodiment, in response to a selection of the end visit interaction, the virtual office management system 100 causes the guest user to be removed from the current workspace. Another example interaction includes a "go to reception" interaction. The go to reception interaction is available to any member of a virtual office environment when a target user is located in a reception area of the virtual office environment. In response to selection of the go to reception interaction, the virtual office management system 100 causes the requesting user and the target user to be placed in the reception area of the virtual office environment.

Figure 10B:
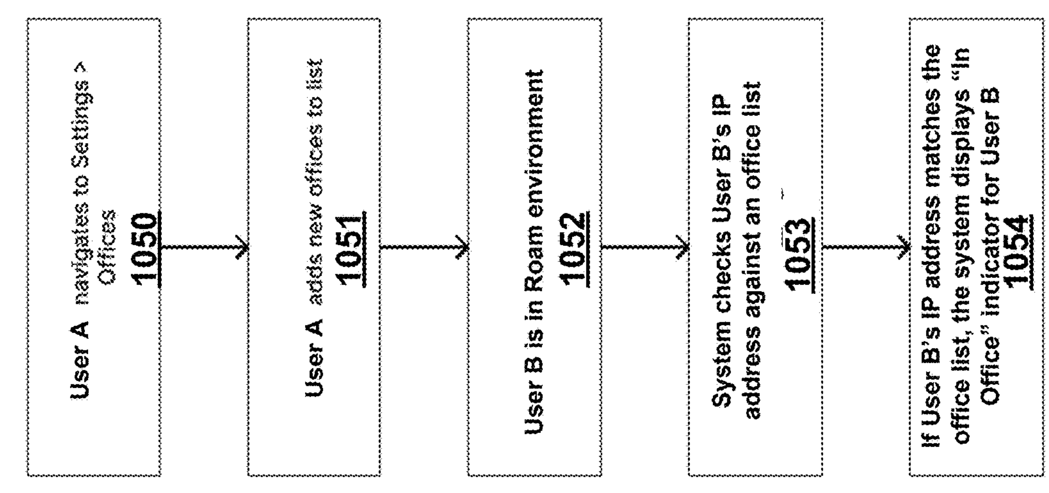
FIG. 10B illustrates an example process executed by a virtual office management system to determine and indicate identify a physical office of a target user, according to embodiments of the present disclosure.
Figure 10A:
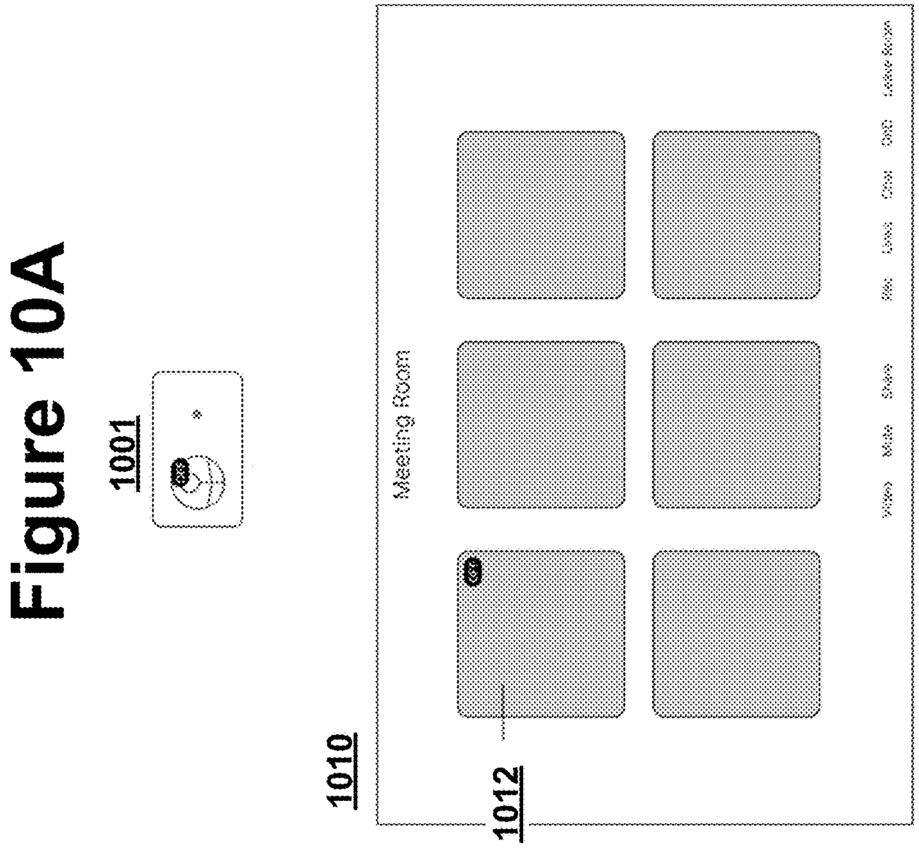
FIG. 10A illustrates an example portion of a map including an indicator denoting that a user occupies a workspace in a virtual office environment, according to embodiments of the present disclosure.

FIG. 10A illustrates an example portion of a map including an indicator (e.g., an "in office" indicator) indicating that a user is "in" a workspace. In an embodiment, the indicator on the map and in meetings is generated by the virtual office management system 100 to indicate to others when a user is in a particular virtual workspace or a physical office building. In an embodiment, the virtual office management system 100 executes the "in office" feature to automatically detect when a user is present in a virtual workspace or a physical office location and display that information to one or more other users in the virtual office environment.

In an embodiment, the virtual office management system 100 receives, from an administrator, a definition of one or more physical office buildings. In this embodiment, the user can establish, via settings, one or more sets of IP addresses that are associated with physical offices. For each office, one or more sets of IP addresses can be associated with identifying information (e.g., a name, a code or abbreviation, and the information identifying the IP block (e.g., using CIDR notation).

In an embodiment, the virtual office management system 100 presents a list of IP addresses of users logged in to a virtual office environment, but not identified as being in a physical office. If the administrator-user is aware that any of the users on the list are currently logged in to the virtual office environment are in the physical office at the time, the administrator-user can provide the virtual office management system 100 with the information to enable the virtual office management system 100 to add one or more user's IP address in association with the physical office and/or building.

In an embodiment, when a user enters the virtual office environment, the virtual office management system 100 determines if the user's IP address matches an IP address previously defined as associated with a physical location. Upon identifying a match, the virtual office management system 100 generates an "in office" indicator (i.e. the label "off" shown in FIG. 10A) in association with the user's profile image 1001 on a map or in the user's video feed 1012 in a meeting room 1010. For example, the indicator (e.g., "off") can include a code or abbreviation (e.g., a three letter abbreviation) identifying the physical office where the user is located.

FIG. 10B illustrates an example process executed by the virtual office management system 100 to determine and indicate identify a physical office of a target user, according to embodiments. In operation 1050, user A (e.g., an administer-user) navigates to an "offices" settings interface and, in operation 1051, adds one or more physical offices to a list of physical offices. For each office, the administrator-user defines the office's name, a three letter abbreviation or code, and a set of IP addresses associated with that physical location (e.g., using CIDR notation).

In operation 1052, the virtual office management system 100 detects that a user (user B) entered a virtual office environment. In operation 1053, the virtual office management system 100 compares an IP address of user B against a list of IP blocks defined in operation 1051. If the virtual office management system 100 detects a match between the IP address of user B and one of the sets of IP blocks associated with the physical location, as defined in the mapping in operation 1051, the virtual office management system 100 generates an "in office" indicator for user B. In an embodiment, the "in office" indicator is displayed by the virtual office management system 100 on the map (e.g., in a meeting room 1001, during a video conference 1012 in a workspace 1010.

Figure 11:
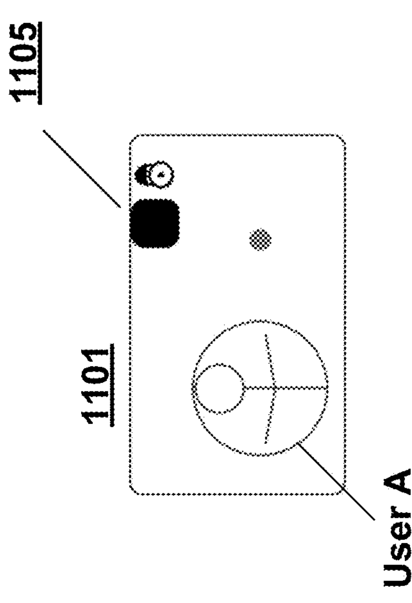
FIG. 11 illustrates an example portion of a map including an indicator generated by a virtual office management system which indicates that a user is using or executing one or more computer-implemented applications, according to embodiments of the present disclosure.

FIG. 11 illustrates an example portion of a map 1101 including an indicator 1105 generated by the virtual office management system 100 which indicates that a user (e.g., user A) is using or executing one or more computer-implemented applications (e.g., a video conference application, a telephone conference application, a collaboration application, any third-party application). In an embodiment, the indicator 1105 can identify the application that is currently being used by user A. In an example, the indicator 1105 can provide a signal to another user that user A is using a particular application, such that the other user may determine that user A is busy and not open to an interaction. In another example, the indicator 1105 can indicate that user A is using a collaboration application, providing a signal to the other user working on the same project that he or she should join the collaboration.

In an embodiment, the virtual office management system 100 is executes a desktop client on a user system, where the client monitors one or more windows currently running on the user system's operating system. Upon detection of an open window corresponding to an active application, the virtual office management system 100 performs a lookup to determine if the active application is included on a predefined list of software applications in a particular state (e.g., a third-party video conferencing application is open and a meeting is currently in progress).

In an embodiment, the virtual office management system 100 generates the indicator 1105 for display on the map 1101 to show contextual information associated with the application. For example, if a user is in a workspace and also participating in a video conference call via the identified third-party application, the virtual office management system 100 can automatically place the user workspace in a "do not disturb" mode. In an example, if the virtual office management system 100 finds multiple users on the same video conference call, the virtual office management system 100 can generate an indication identifying the users participating in the video conference. In an example, the virtual office management system 100 can generate an indication that multiple users are viewing a same document in a third-party application.

According to embodiments, the virtual office management system 100 generates one or more links configure to take or move one or more users into a specific workspace in the virtual office environment. In an embodiment, the virtual office management system 100 can create a link, that when clicked, places a user into a specific workspace. The workspace links enable a guest to be sent to the target workspace and can be included in a meeting invitation to enable efficient navigation to a meeting workspace.

In an embodiment, the virtual office management system 100 can generate a personal link on behalf of a user. The personal link can be associated with a particular user. When clicked, a visitor or guest is placed by the virtual office management system 100 in an appropriate virtual office environment and placed into a workspace (e.g., a reception area, a user's office workspace, etc.) The virtual office management system 100 enables the visitor or guest to use the link if a member is available (i.e., located in the virtual office environment and not in a workspace with a current "do not disturb" mode). If the visitor or guest is not a member of the associated virtual office environment, the user is identified as a "guest", with the corresponding member as a host. In an embodiment, the virtual office management system 100 can reset the personal link (e.g., a periodic reset) so that external users (e.g., guests) do not have evergreen access to the virtual work environment via the personal link.

In an embodiment, the virtual office management system 100 can generate a meeting link on behalf of a user. The meeting link provides give access to a specific workspace on a specific floor in a specific virtual office environment, in accordance with one or more parameters established by the creator or host of the meeting. For example, a user (host) establishes parameters of the meeting, including a floor of the workspace for the meeting, access details associated with the meeting (e.g., members only meeting (private) or allow visitors (public)), and meeting details (e.g., a start time of the meeting, an end time of the meeting, a date of the meeting). In an embodiment, the meeting link is only active (e.g., only enables access) during a time associated with the meeting.

Figure 12:
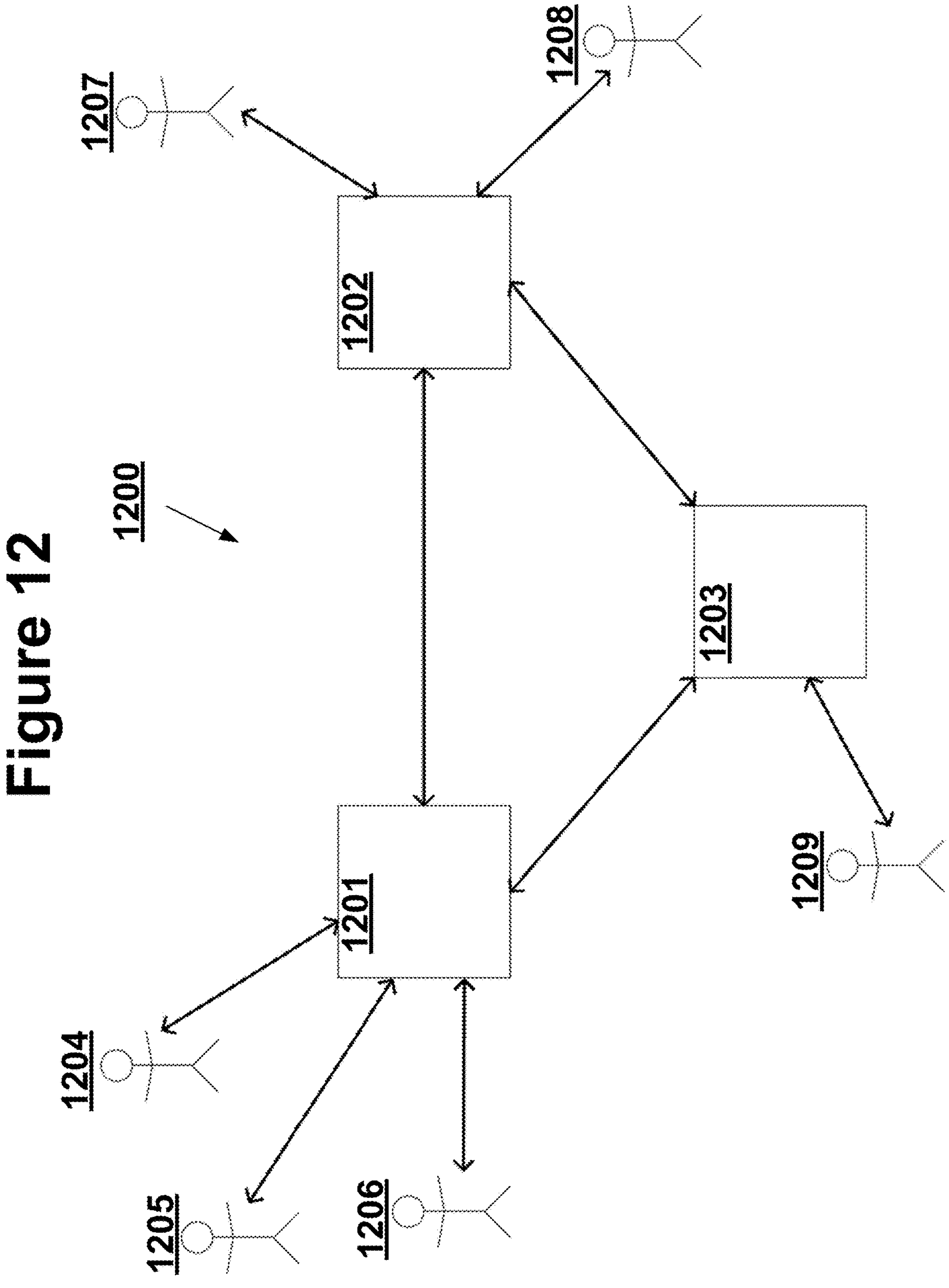
FIG. 12 illustrates an example architecture employed by a virtual office management system to manage communications among multiple users via a set of computing devices in a virtual office environment, according to embodiments of the present disclosure.

FIG. 12 illustrates an example architecture 1200 employed by the virtual office management system 100 to manage communications among multiple users (e.g., users 1204, 1205, 1206, 1207, 1208, and 1209) via a set of computing devices 1201, 1202, 1203 (e.g., servers) in a virtual office environment. According to embodiments, the virtual office management system 100 enables two or more users to connect with one another an audio/video or audio-only conversation. To address potential latency and jitter issues introduced if the communication signals travel far distances, the virtual office management system 100 employs a region-based communication architecture. In this approach, the virtual office management system 100 manages the communications using computing devices (e.g., servers) that may be geographically dispersed. According to embodiments, each participant-user associated with a conversation is communicatively coupled by the virtual office management system 100 via a computing device (e.g., server) that is determined to be closest geographically to the corresponding user system. According to embodiments, each user system sends a respective stream associated with the conversation to the identified computing device (e.g., the geographically-closest server). In this embodiment, the virtual office management system 100 managers the conversation by identifying which of the other conversation participants are in the same conversation and which servers those participants are connected to during the conversation.

In an embodiment, the region-specific servers of the virtual office management system 100 send the various streams to each other over a private network (which should be faster and less prone to jitter) and then forward it to the participants over the public internet. In this way, a given participant is only ever sending and receiving data from the server closest to that user system, and the distance the data travels over the public internet is reduced. Additionally, as the geographic composition of the participants changes, the virtual office management system 100 adapts in real-time to maintain low latency and jitter. This approach provides for the advantageous reduction in latency and jitter, as compared to typical approaches where every user sends and receives streams directly from every other user. This typical approach disadvantageously results in more data being sent over the public internet, which can be slower and more prone to jitter than private networks. This typical approach also requires the data to travel over longer distances across these slower networks.

In an embodiment, the virtual office management system 100 executes a process flow to enable the optimization of the communications in a virtual office environment between multiple users that are geographically dispersed. In the example shown in FIG. 12, users 1204, 1205, 1206, 1207, 1208, and 1209 join a particular conversation (e.g., a video conference, an audio conference, etc.). In an embodiment, the virtual office management system 100 identifies a computing device (e.g., server 1201, 1202, or 1203) which is geographically closest to each user. As shown in this example, the system determines that users 1204, 1205, and 1206 are closest to server 1201; users 1207 and 1208 are closest to server 1202; and user 1209 is closest to server 1203. In response to determining the closest server, the virtual office management system 100 connects each user the server nearest to them. In an embodiment, each user then sends his or her stream of data over a public network (e.g., the public internet) to the server to which they are connected. In an embodiment, each server 1201, 1202, and 1203 sends the other servers in the architecture 1200 the stream data for the respective users connected to it via a private network. For example, server 1201 receives stream data from servers 1202 and 1203 via a private network; server 1202 receives stream data from servers 1201 and 1203 via the private network; and server 1203 receives stream data from servers 1201 and 1202 via the private network. Each server then sends stream data to each of its connected users via the public network.

According to embodiments, the virtual office management system 100 implements a congestion control algorithm, without being paired directly with an encoder. In an embodiment, the virtual office management system 100 tracks “unacknowledged sent bytes” by tagging every outgoing packet with a sequence number (e.g., when data is sent to a client such as a video frame or audio sample), every outgoing packet is tagged with a sequence number. In an embodiment, the client periodically sends back what sequence numbers it has received. The virtual office management system 100 monitors the packets “in-flight” by keeping a running sum of their sizes. When the server of the virtual office management system 100 gets an acknowledgement by the client, it removes from the sum of in-flight packets.

According to embodiments, the virtual office management system 100 computes an “estimated one-way queuing delay” metric. In this embodiment, the virtual office management system 100 tracks when a packet is sent. When clients send acknowledgements, the client tracks when the client received the packet. Since the server and client clocks may be different, the times cannot be directly compared. In an embodiment, the server of the virtual office management system 100 tracks the difference between arrival time and departure time of a packet, and then determines corresponding trends over time. The server of the virtual office management system 100 looks at the minimum value for the difference over the last time period (e.g., the last 10 minutes) and compares every packet’s difference to that minimum. If the delay increases, the virtual office management system 100 determines that there is congestion in the network.

In an embodiment, the virtual office management system 100 calculates a smoothed moving average of the received and acknowledged bitrate, from a server’s perspective. In an embodiment, this may be lower than the actual received bitrate because acknowledgements can be lost. In an embodiment, the virtual office management system 100 determines an “allowed send window” metric. In-flight (unacknowledged) data can reach 225 ms plus the user’s latency at their recently acknowledged bitrate. For example, if the latency is 25 ms and recently acknowledged bitrate is 1 Mbps, the virtual office management system 100 determines the user system is allowed to have a send window of 250 kbit (=31.25 KB) of data.

In an embodiment, the virtual office management system 100 determines if a link is congested and adjusts an outgoing bitrate accordingly. In this embodiment, if in-flight data exceeds the “send window”, or if queueing delay exceeds a threshold level (e.g., 100 ms), the virtual office management system 100 determines the link is congested. If in-flight data exceeds a threshold level (e.g., 2× the send window or queueing delay exceeds 200 ms), the virtual office management system 100 determines the link is severely congested. For congested links, the outgoing bitrate is set to a first threshold percentage (e.g., 90%) of the recently acknowledged bitrate. For severely congested links, the bitrate is set to a second threshold level (e.g., 60%) of the recently acknowledged bitrate.

In an example, because acknowledgements take time to send back to the server and moving averages take time to level off (and are being used to determine if the link is congested), the server of the virtual office management system 100 may ignore the congested signal for a set period of time after making an upgrade for a video. This allows the moving average to settle a bit and prevents false positives directly after a video upgrade.

According to embodiments, the virtual office management system 100 generates automated meeting summaries corresponding to communications taking place between users in a workspace of a virtual office environment. In this embodiment, the virtual office management system 100 generates the meeting summaries or minutes (also referred to as "magic minutes") that can be distributed to meeting participants upon completion of the meeting. In an embodiment, when the "magic minutes" feature is enabled, the virtual office management system 100 records a transcript of the meeting and provides the transcript to a large language model (LLM). Upon completion of the meeting, the virtual office management system 100 generates a group chat including the meeting participants and the virtual office management system 100 sends the group a summary of the meeting. In an embodiment, the meeting participants can submit follow-up questions or comments to the virtual office management system 100, which are answered by the virtual office management system 100 executing a chatbot with access to the LLM.

In an embodiment, the virtual office management system 100 generates an indicator associated with a user that provides a way for the user to let others know that they are away and will return at a specific time (also referred to as a "will return" feature). In this embodiment, if a user needs to leave his or her computing device and would like to let other users in the virtual office environment know when the user plans to return. In an embodiment, the user is provided with an interface and fields to provide an inputs a selection of the "will return" option and selects a time the user is expected to return to the virtual office environment. In an embodiment, while the user is away, the virtual office management system 100 displays a clock in a workspace associated with the user. When hovered over by another user, the clock indicates the time when the person will return to the virtual office environment. In an embodiment, if the person still has not returned by the indicated return time, the virtual office management system 100 removes the user from the "will return" mode.

In an embodiment, the virtual office management system 100 generates a digital representation of a physical office space within the virtual office environment. In an embodiment, an entity (e.g., a company) may have multiple employees in a shared physical office space that join a meeting in the virtual office environment. In this example, the virtual office management system 100 enables the meeting room to access the virtual office environment and adds this "cloud room" to the map of the virtual office environment.

Figure 13:
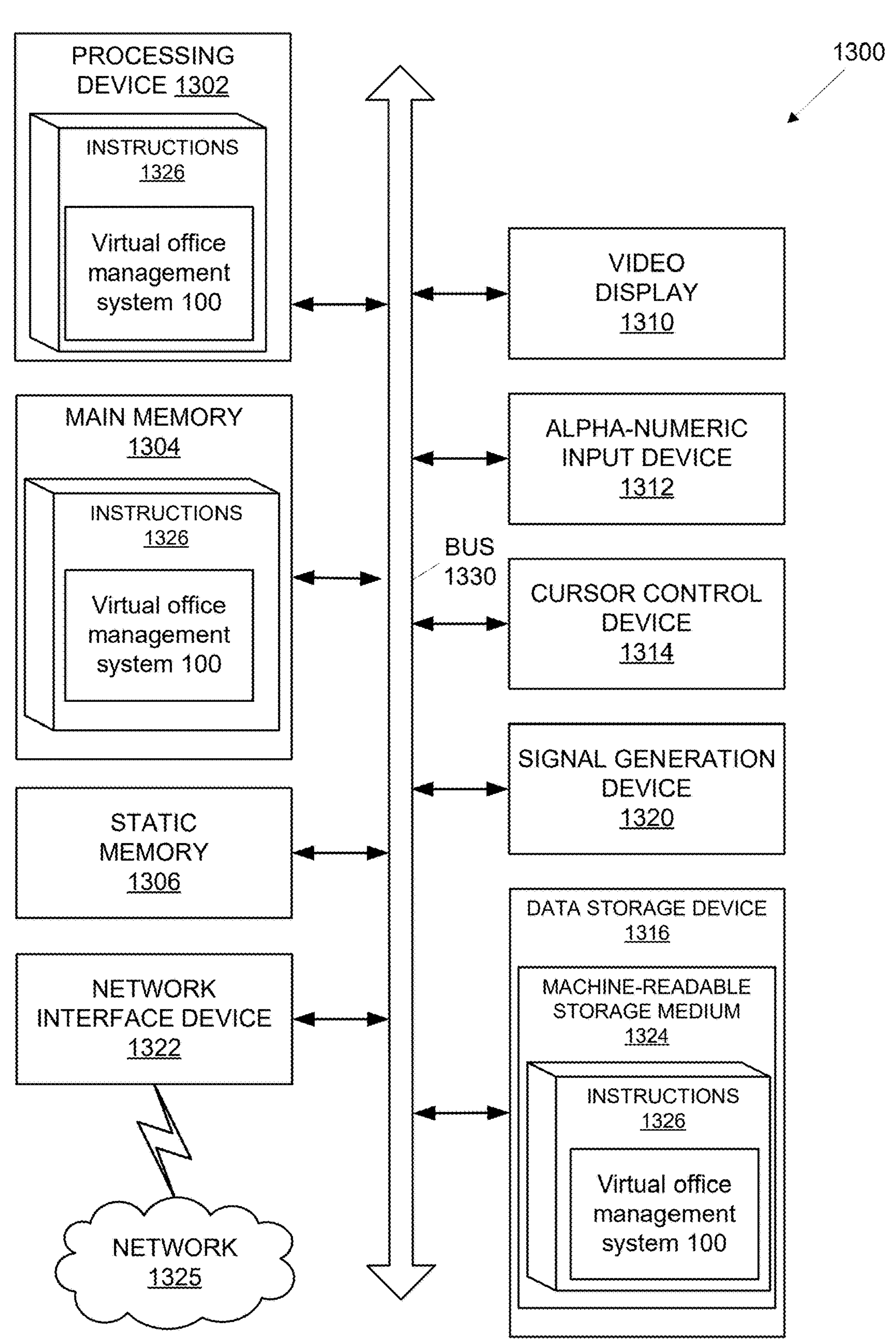
FIG. 13 is a block diagram of an example computer system in which implementations of the present disclosure can operate.

FIG. 13 illustrates an example computer system 1300 operating in accordance with some embodiments of the disclosure. In FIG. 13, a diagrammatic representation of a machine is shown in the exemplary form of the computer system 1300 within which a set of instructions, for causing the machine to perform any one or more of the methodologies discussed herein, may be executed. In alternative embodiments, the machine 1300 may be connected (e.g., networked) to other machines in a local area network (LAN), an intranet, an extranet, or the Internet. The machine 1300 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 1300. Further, while only a single machine is illustrated, the term "machine" shall also be taken to include any collection of machines that individually or jointly execute a set (or multiple sets) of instructions to perform any one or more of the methodologies discussed herein.

The example computer system 1300 may comprise a processing device 1302 (also referred to as a processor or CPU), a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1316), which may communicate with each other via a bus 1330.

Processing device 1302 represents one or more general-purpose processing devices such as a microprocessor, central processing unit, or the like. More particularly, the processing device may be a complex instruction set computer (CISC) processor, reduced instruction set computer (RISC) processor, very long instruction word (VLIW) processor, or processor implementing other instruction sets, or processors implementing a combination of instruction sets. Processing device 1302 may also be one or more special-purpose processing devices such as a graphics processing unit (GPU), an application specific integrated circuit (ASIC), a field programmable gate array (FPGA), a digital signal processor (DSP), network processor, or the like. Processing device 1302 is configured to execute the virtual office management system 100 performing the operations and steps discussed herein. For example, the processing device 1302 may be configured to execute instructions implementing the processes and methods described herein, for supporting an virtual office management system 100, in accordance with one or more aspects of the disclosure.

Example computer system 1300 may further comprise a network interface device 1322 that may be communicatively coupled to a network 1325. Example computer system 1300 may further comprise a video display 1310 (e.g., a liquid crystal display (LCD), a touch screen, or a cathode ray tube (CRT)), an alphanumeric input device 1312 (e.g., a keyboard), a cursor control device 1314 (e.g., a mouse), and an acoustic signal generation device 1320 (e.g., a speaker).

Data storage device 1316 may include a computer-readable storage medium (or more specifically a non-transitory computer-readable storage medium) 1324 on which is stored one or more sets of executable instructions 1326. In accordance with one or more aspects of the disclosure, executable instructions 1326 may encode various functions of the virtual office management system 100 in accordance with one or more aspects of the disclosure.

Executable instructions 1326 may also reside, completely or at least partially, within main memory 1304 and/or within processing device 1302 during execution thereof by example computer system 1300. Main memory 1304 and processing device 1302 also constitute computer-readable storage media. Executable instructions 1326 may further be transmitted or received over a network via network interface device 1322.

While computer-readable storage medium 1324 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "analyzing," "using," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk (including optical disks, compact disc read-only memory (CD-ROMs), and magnetic-optical disks, read-only memories (ROMs), random access memories (RAMs), EPROMs, EEPROMs, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

generating, by a processing device, a virtual office environment comprising an interactive map comprising a set of workspaces, wherein each workspace of the set of workspaces is a virtual representation that is individually selectable via the map;

assigning a first user system to a first workspace of the set of workspaces;

assigning a second user system to a second workspace of the set of workspaces;

generating an interface comprising a display of the interactive map comprising the first workspace and the second workspace, wherein the interactive map displays first identifying information associated with the first user system in a first map portion corresponding to the first workspace and second identifying information associated with the second user system in a second map portion corresponding to the second workspace; and causing a first virtual representation associated with the first user system to move from the first workspace to the second workspace by receiving a selection by the first user system of the second workspace on the interactive map, wherein entry by the first user system into the second workspace causes automatic launching of a communication channel between the first user system and the second user system, and wherein a type of the communication channel is selected based on a workspace type associated with the second workspace.

2. The method of claim 1, further comprising:

generating a written summary corresponding to a communication between the first user system and the second user system occurring within the communication channel of the second workspace; and distributing the written summary to one or more of the first user system or the second user system.

3. The method of claim 2, further comprising:

submitting the written summary to a large language model;

generating a group chat session including the first user system and the second user system;

receiving, via the group chat session, one or more of a question or a comment relating to the written summary from one of the first user system or the second user system; and generating, by the large language model, a response to the one or more of the question or the comment.

4. The method of claim 1, further comprising:

receiving, via the interface from a third user system, an interaction with an image associated with the first user system; and in response to the interaction, generating an interaction interface including the first user system and the third user system, wherein the interaction interface displays one or more available actions.

5. The method of claim 4, further comprising:

determining a context associated with the first user system; and determining the one or more available actions based on the context associated with the first user system.

6. The method of claim 5, further comprising associating, based on the context, the first workspace into a first mode of a set of modes.

7. The method of claim 1, further comprising:

receiving, via the interface from a third user system, a knock interaction associated with the first workspace; and providing, to the first user system, an indication associated with the knock interaction.

8. A system comprising:

a memory to store instructions; and a processing device operatively coupled to the memory, the processing device to execute the instructions to perform operations comprising:

generating a virtual office environment comprising an interactive map comprising a set of workspaces, wherein each workspace of the set of workspaces is a virtual representation that is individually selectable via the map;

assigning a first user system to a first workspace of the set of workspaces;

assigning a second user system to a second workspace of the set of workspaces;

generating an interface comprising a display of the interactive map comprising the first workspace and the second workspace, wherein the interactive map displays first identifying information associated with the first user system in a first map portion corresponding to the first workspace and second identifying information associated with the second user system in a second map portion corresponding to the second workspace; and causing a first virtual representation associated with the first user system to move from the first workspace to the second workspace by receiving a selection by the first user system of the second workspace on the interactive map, wherein entry by the first user system into the second workspace causes automatic launching of a communication channel between the first user system and the second user system, and wherein a type of the communication channel is selected based on a workspace type associated with the second workspace.

9. The system of claim 8, the operations further comprising:

generating a written summary corresponding to a communication between the first user system and the second user system occurring within the communication channel of the second workspace; and distributing the written summary to one or more of the first user system or the second user system.

10. The system of claim 9, the operations further comprising:

submitting the written summary to a large language model;

generating a group chat session including the first user system and the second user system;

receiving, via the group chat session, one or more of a question or a comment relating to the written summary from one of the first user system or the second user system; and generating, by the large language model, a response to the one or more of the question or the comment.

11. The system of claim 8, the operations further comprising:

receiving, via the interface from a third user system, an interaction with an image associated with the first user system; and in response to the interaction, generating an interaction interface including the first user system and the third user system, wherein the interaction interface displays one or more available actions.

12. The system of claim 11, the operations further comprising:

determining a context associated with the first user system; and determining the one or more available actions based on the context associated with the first user system.

13. The system of claim 12, the operations further comprising associating, based on the context, the first workspace into a first mode of a set of modes.

14. The system of claim 8, the operations further comprising:

receiving, via the interface from a third user system, a knock interaction associated with the first workspace; and providing, to the first user system, an indication associated with the knock interaction.

15. A non-transitory computer readable storage medium having instructions that, if executed by a processing device, cause the processing device to perform operations comprising:

generating a virtual office environment comprising an interactive map comprising a set of workspaces, wherein each workspace of the set of workspaces is a virtual representation that is individually selectable via the map;

assigning a first user system to a first workspace of the set of workspaces;

assigning a second user system to a second workspace of the set of workspaces;

generating an interface comprising a display of the interactive map comprising the first workspace and the second workspace, wherein the interactive map displays first identifying information associated with the first user system in a first map portion corresponding to the first workspace and second identifying information associated with the second user system in a second map portion corresponding to the second workspace; and causing a first virtual representation associated with the first user system to move from the first workspace to the second workspace by receiving a selection by the first user system of the second workspace on the interactive map, wherein entry by the first user system into the second workspace causes automatic launching of a communication channel between the first user system and the second user system, and wherein a type of the communication channel is selected based on a workspace type associated with the second workspace.

16. The non-transitory computer readable storage medium of claim 15, the operations further comprising:

generating a written summary corresponding to a communication between the first user system and the second user system occurring within the communication channel of the second workspace; and distributing the written summary to one or more of the first user system or the second user system.

17. The non-transitory computer readable storage medium of claim 16, the operations further comprising:

submitting the written summary to a large language model;

generating a group chat session including the first user system and the second user system;

receiving, via the group chat session, one or more of a question or a comment relating to the written summary from one of the first user system or the second user system; and generating, by the large language model, a response to the one or more of the question or the comment.

18. The non-transitory computer readable storage medium of claim 15, the operations further comprising:

receiving, via the interface from a third user system, an interaction with an image associated with the first user system; and in response to the interaction, generating an interaction interface including the first user system and the third user system, wherein the interaction interface displays one or more available actions.

19. The non-transitory computer readable storage medium of claim 18, the operations further comprising:

determining a context associated with the first user system;

determining the one or more available actions based on the context associated with the first user system; and associating, based on the context, the first workspace into a first mode of a set of modes.

20. The non-transitory computer readable storage medium of claim 15, the operations further comprising:

receiving, via the interface from a third user system, a knock interaction associated with the first workspace; and providing, to the first user system, an indication associated with the knock interaction.

* * * * *